(12) United States Patent
Simpson et al.

(10) Patent No.: US 11,734,764 B1
(45) Date of Patent: *Aug. 22, 2023

(54) USER INTERFACE FOR PLANNING TOOL

(71) Applicant: Wells Fargo Bank, N.A., San Francisco, CA (US)

(72) Inventors: Jeffrey Thomas Simpson, Pinehurst, NC (US); Matthew Fitzroy Lynch, Swansea, IL (US); Kyle Patrick Mitchell, Charlotte, NC (US); Amir Zelazny, San Francisco, CA (US); Brooks Gallagher LeComte, St. Louis, MO (US); Faith Maria Lane, St. Louis, MO (US); Derrek Ramon Turner, Charlotte, NC (US); Daniel Gracey, Lake Saint Louis, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/643,776

(22) Filed: Dec. 10, 2021

Related U.S. Application Data

(63) Continuation of application No. 16/948,818, filed on Oct. 1, 2020, now Pat. No. 11,200,623, which is a
(Continued)

(51) Int. Cl.
*G06Q 40/06* (2012.01)
*G06F 3/0484* (2022.01)
(Continued)

(52) U.S. Cl.
CPC ......... *G06Q 40/06* (2013.01); *G06F 3/04845* (2013.01); *G06T 11/206* (2013.01); *G06T 2200/24* (2013.01)

(58) Field of Classification Search
None
See application file for complete search history.

(56) References Cited

U.S. PATENT DOCUMENTS

| D751,108 S | 3/2016 | Caldwell |
|---|---|---|
| 10,402,896 B1 | 9/2019 | Lopez et al. |

(Continued)

OTHER PUBLICATIONS

"U.S. Appl. No. 15/691,649, Examiner Interview Summary dated Jan. 22, 2020", 5 pgs.
(Continued)

*Primary Examiner* — Joseph W. King
(74) *Attorney, Agent, or Firm* — Schwegman Lundberg & Woessner, P.A.

(57) ABSTRACT

Various examples are directed to systems and methods for interfacing between a user and a computing device. The computing device may receive data describing a projected periodic savings amount and
first expense data describing a first expense of the user. The first expense data may indicate an amount of the first expense and a first expense time when the first expense will be incurred. The computing device may display a graphical user interface at a display. The graphical user interface may comprise a savings shape having a size based at least in part on the projected periodic savings amount and a first expense shape having a size based at least in part on the first amount. The computing device may receive an instruction to place the first expense shape in the savings shape and may determine that the projected periodic savings amount is sufficient to fund the first expense at the first time. The computing device may display, at the graphical user interface, the first expense shape positioned within the savings shape.

20 Claims, 18 Drawing Sheets

Related U.S. Application Data continuation of application No. 15/691,649, filed on Aug. 30, 2017, now Pat. No. 10,825,092.

(51) Int. Cl.
  *G06T 11/20*      (2006.01)
  *G06F 3/04845*    (2022.01)

(56) References Cited

U.S. PATENT DOCUMENTS

| | | |
|---|---|---|
| 10,825,092 B1 | 11/2020 | Simpson et al. |
| 2002/0015671 A1 | 10/2002 | Lee |
| 2004/0236652 A1 | 11/2004 | Heiges et al. |
| 2006/0129468 A1 | 6/2006 | Lovesy et al. |
| 2007/0027736 A1 | 2/2007 | Reynolds et al. |
| 2010/0094774 A1 | 4/2010 | Jackowitz et al. |
| 2011/0099063 A1 | 4/2011 | Clemmons |
| 2011/0178908 A1 | 7/2011 | Benefield et al. |
| 2014/0164198 A1 | 6/2014 | Caldwell |
| 2014/0236789 A1 | 8/2014 | Caldwell |
| 2015/0081498 A1 | 3/2015 | Caldwell et al. |
| 2016/0125524 A1 | 5/2016 | Loskamp |

OTHER PUBLICATIONS

"U.S. Appl. No. 15/691,649, Examiner Interview Summary dated Apr. 17, 2020", 2 pgs.

"U.S. Appl. No. 15/691,649, Non Final Office Action dated Oct. 30, 2019", 13 pgs.

"U.S. Appl. No. 15/691,649, Notice of Allowance dated Jun. 16, 2020", 10 pgs.

"U.S. Appl. No. 15/691,649, Response filed Jan. 30, 20 to Non Final Office Action dated Oct. 30, 2019", 18 pgs.

"U.S. Appl. No. 15/691,649, Supplemental Amendment filed Apr. 17, 2020", 10 pgs.

"U.S. Appl. No. 16/948,818, Examiner Interview Summary dated May 19, 2021", 2 pgs.

"U.S. Appl. No. 16/948,818, Notice of Allowance dated Aug. 11, 2021".

U.S. Appl. No. 15/691,649 10,825,092, filed Aug. 30, 2017, User Interface for Planning Tool.

U.S. Appl. No. 16/948,818 11,200,623, filed Oct. 1, 2020, User Interface for Planning Tool.

US 11,734,764 B1

USER INTERFACE FOR PLANNING TOOL

CROSS-REFERENCE TO RELATED APPLICATION

This application is a continuation of U.S. patent application Ser. No. 16/948,818, filed Oct. 1, 2020, now issued as U.S. Pat. No. 11,200,623, which is a continuation of U.S. patent application Ser. No. 15/691,649, filed Aug. 30, 2017, now issued as U.S. Pat. No. 10,825,092, each of which are incorporated by reference herein in their entirety.

TECHNICAL FIELD

Embodiments described herein generally relate to systems and methods for improved interfacing between a human user and a computing device.

BACKGROUND

Computer-implemented planning tools, such as financial planning tools, exploit the capabilities of computing devices to generate complicated estimates of future events.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
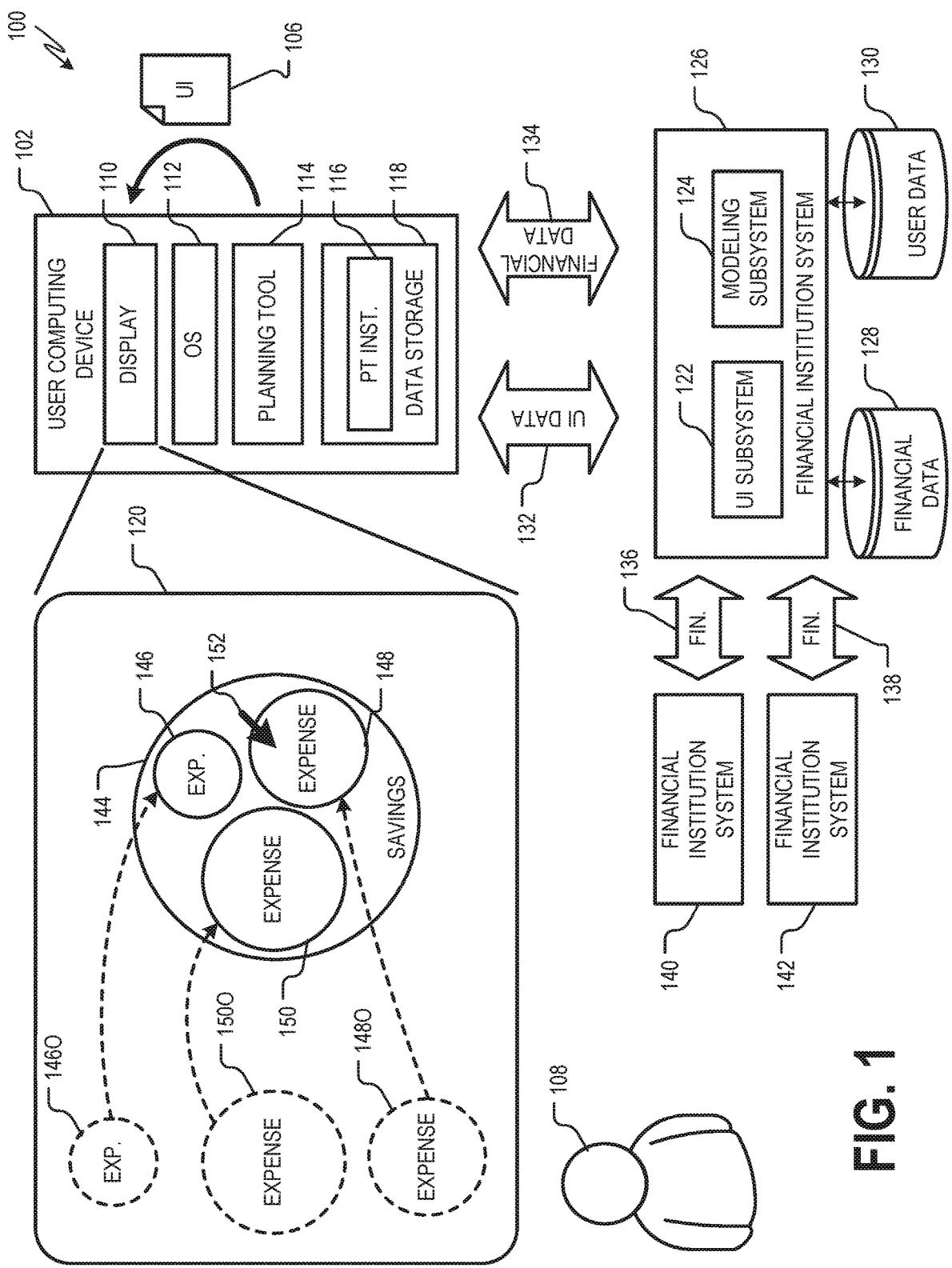
FIG. 1 is a diagram showing one example of an environment for using a planning tool with a user interface (UI) for interfacing with a user.

Computing devices are capable of quickly and consistently performing large numbers of complex calculations. Computer-implemented planning tools, such as financial planning tools, utilize these capabilities to quickly evaluate complex models of a user's income and expenses. The usefulness of a planning tool, however, is directly related to the effectiveness of the user interface (UI). Although the capabilities of computing devices make it possible to model and evaluate a large number of different future scenarios, the usefulness of a planning tool to the user depends on discovering and evaluating the future scenarios that are most relevant to the user. In this sense, a computer-implemented planning tool may be likened to a powerful sports cars. Without suitable tires and a properly-tuned suspension, the sports car will spin its wheels and waste the power of its engine. Similarly, without a suitably optimized UI, a computer-implemented planning tool may waste the power of its underlying computing device evaluating the wrong models, evaluating models with the wrong parameters, etc. Without an effective UI, the computing device may quickly and accurately perform a large number of operations, but still fail to provide the user's best plan.

Various examples described herein are directed to computer-implemented planning tools that include a UI for interfacing a user to the planning tool. The UI may be provided to a user at a display or other suitable input/output (I/O) device of a computing device. The UI may display a savings shape and one or more expense shapes. A size of the saving shape is based at least in part on a projected level of periodic savings for the user. A size of the expense shape is based at least in part on an amount of the expense. Because the size of the savings shape is based on the amount that the user intends to save and the size of the expense shapes are based on the amounts of the expenses, the user is provided with a sense of the relationship between savings and the future expenses that can be funded with the savings.

The planning tool may be programmed to allow a user to select an expense shape and move it to the savings shape, indicating that the user wants to consider using the savings represented by the savings shape to fund the expense represented by the expense shape. If the user's savings are sufficient fund the expense, the planning tool may place the expense shape within the savings shape. If the user's savings are not sufficient to fund the expense, the planning tool may show the expense shape ejected from the savings shape. In some examples, showing the expense shape ejected from the savings shape may include showing the expense shape outside of the savings shape. In some examples, showing the expense shape ejected from the savings shape may include displaying an animation showing the expensing shape being removed from the expense shape.

In some examples, the planning tool is programmed to permit the user to include more than one expense shape in the savings shape. For example, the user may want to consider funding more than one expense with the user's savings. The user may select a first expense shape and move it to the savings shape. If the user's savings are sufficient to fund the first expense, the planning tool may display the first expense shape within the savings shape. Because the size of the savings shape and the size of the first expense shape are based on the amounts of the respective savings and first expense, a remainder of the savings shape may provide the user with an indication of how much of the savings remains to fund additional expenses. For example, the remainder may include the portion of the savings that is available to fund another expense. The user may be able to visually compare the remainder of the savings shape and a second expense shape associated with a second expense to get a sense of whether the savings are sufficient to fund the second expense.

The user may select the second expense shape and attempt move it over the savings shape. If the savings is sufficient to fund both the first expense and the second expense, the planning tool may display the second expense shape and the first expense shape in the savings shape. If the savings is not sufficient to fund both the first and second expenses, the planning tool may display the savings shape with one or more expense shapes ejected therefrom.

In some examples, the sizes of the savings shape and the expense shapes are proportional to a projected periodic savings amount, indicating the projected amount that the user will save for each instance of a time period (e.g., each month, each bi-week, each year, etc.). For example, the size of the savings shape may be proportional to a projected monthly savings amount. Also, in some examples, the size of an expense shape may be proportional to the monthly saving that would be necessary to fund the expense amount at the time that the expense amount is expected to be incurred. In this way, the user may relate the expense and the savings on a common scale.

FIG. 1 is a diagram showing one example of an environment 100 for using a planning tool 114 with a user interface 106 for interfacing with a user 108. The environment 100 includes a user computing device 102 directly or indirectly in communication with one or more financial institution systems 126, 140, 142. The user computing device 102 may be any suitable computing device used by the user 108 to execute the planning tool 114. For example, the user computing device 102 may be or include a laptop computer, a desktop computer, a tablet computer, a smart phone, etc. The financial institution systems 126, 140, 142 may be or include any suitable type of computing devices such as, for example, one or more servers. The various computing devices 102, 126, 140, 142 may be at a single geographic location and/or may be distributed across multiple geographic locations.

The user computing device 102 may execute the planning tool 114 to provide the UI 106 to the user 108, for example via a display 110 of the user computing device 102. The user computing device 102 may comprise a data storage device 118 that may store planning tool instructions 116. A processor unit of the user computing device 102 may execute the planning tool instructions 116 to implement the planning tool 114. (See FIGS. 16-18 for examples of computing devices including one or more processor units.) In some examples, the data storage device 118 may additionally store working data for the planning tool 114 including, for example, UI data 132 and/or financial data 134 provided to and/or received from the financial institution system 126.

The user computing device 102 may also comprise a display 110 that may be used to provide the UI 106 to the user 108. The display 110 may be or include any suitable type of display including, for example, a liquid crystal display (LCD), an organic light emitting diode (OLED) display, etc. In some examples, the display 110 is or includes other I/O devices such as, for example, microphones, speakers, projectors, etc.

The planning tool 114 may provide the UI 106 via the display 110. The user 108 may provide input to the planning tool 114 via the UI 106 in any suitable manner. In some examples, the user 108 may provide input using a suitable input device of the user computing device 102. In some examples, the display 110 includes a touchscreen or other touch-sensitive display allowing the user 108 to provide input to the UI 106. Also, in some examples, the user 108 may provide input to the UI 106 using various other input devices of the user computing device 102 in addition to or instead of using a touchscreen. Other input devices may include, for example, a mouse, a track ball, etc.

The user computing device 102 may also execute an operating system 112. The operating system 112, as described herein, may provide an abstraction layer between applications executing at the user computing device 102 and hardware of the user computing device 102, such as the display 110, data storage device 118, network adapters, sensors, other I/O devices, etc. For example, the planning tool 114 may access the display 110 via the operating system 112.

The planning tool 114 executing at the user computing device 102 may be in communication with the financial institution system 126, for example, to receive or exchange financial data 134 and/or UI data 132. Financial data 134 may describe financial accounts and/or transactions of the user 108. For example, financial data 134 may indicate a balance and/or activity of savings and/or retirement accounts held by the user 108. Financial data 134 may also indicate transactions made be the user 108 such as, for example, deposits to one or more financial accounts, disbursements from one or more financial accounts, etc. UI data 132 may indicate content to be displayed at the UI 106 and/or inputs received from the user 108 via the UI. The financial institution system 126 may include one or more databases or other data stores including, for example, a financial data store 128 for storing financial data 134 and/or a user data store 130 for storing UI data 132.

The financial institution system 126 may include a UI subsystem 122 and/or a modeling subsystem 124. The modeling subsystem 124 may be configured to evaluate one or more financial models based at least in part on the savings and expenses of the user 108. For example, the modeling subsystem 124 may extrapolate the user's future savings based on a projected periodic savings amount for the user 108. For example, extrapolating the user's savings from the projected periodic savings amount at a given time in the future may include modeling complex market conditions. In some examples, the modeling subsystem 124 may also model various expenses of the user 108.

For example, the modeling subsystem 124 may be programmed to convert an expense amount and an expense time when the expense will be incurred to a periodic amount that the user 108 would need to save between the present time and the expense time to meet the expense. For example, if an expense includes spending X dollars at a time that is 10 years in the future, the modeling subsystem 124 may determine how much the customer would have to save periodically (e.g., monthly) in order to have X dollars 10 years from the present. In some examples, one or more of the user's expenses may include providing the user 108 with an income over time (e.g., a monthly or other periodic retirement income). The modeling subsystem 124 may convert the income over time to a present periodic amount that the user 108 would have to save to meet the expense. The modeling subsystem 124 may consider an assumed rate of return. The modeling subsystem 124 may determine the assumed rate of return in any suitable way. In some examples, the assumed rate of return may be a historical average return of an index (e.g., the NASDAQ index, the Dow Jones Industrial Average index, etc.), a historical average return of an asset or asset class in the customer's portfolio, etc.

In the example of FIG. 1, the financial institution system 126 is in communication with additional financial institution systems 140, 142. For example, the financial institution system 126, in some examples, is associated with a first financial institution, for example, where the user 108 holds one or more accounts. The user 108 may hold other accounts at other financial institutions. The financial institution systems 140, 142 may provide respective financial data 136, 138 describing accounts held by the user 108 to the financial institution system 126. In some examples, the financial institution systems 140, 142 may bypass the financial institution system 126 and provide the financial data 136, 138 directly to the user computing device 102 (e.g., the planning tool 114 executing at the user computing device 102). Also, although the financial institution system 126 is described as being associated with a financial institution, in some examples, the functionality of the financial institution system 126 described herein may be provided by a third-party system that is not associated with a financial institution.

In various examples, functionality for generating the UI 1106 may be distributed between the user computing device 102 and/or the financial institution system 126 in any suitable manner. In some examples, the financial institution system 126 may be omitted altogether and the planning tool 114 may interface directly with one or more of the financial institution systems 140, 142 and/or perform the functionality of the UI subsystem 122 and/or the modeling subsystem 124. Also, in various examples, some or all of the functionality of the UI subsystem 122 and/or the modeling subsystem 124 may be performed by the planning tool 114 executed at the user computing device 102.

FIG. 1 also shows a screen 120 of the UI 106 that may be provided to the user 108, for example, at the display 110 of the user computing device 102. The screen 120 includes a savings shape 144 and three example expense shapes 146, 148, 150. A size of the savings shape 144 may indicate the projected periodic savings of the user 108. The sizes of the expense shapes 146, 148, 150 may indicate the amount of the expenses. In some examples, the sizes of the expense shapes 146, 148, 150 are also based at least in part on when the expenses will be incurred.

The expense shapes 146, 148, 150 have been moved by the user 108 from original positions 146O, 148O, 150O outside of the savings shape 144 to the positions shown inside of the savings shape 144. In some examples, the user 108 selects the expense shapes 146, 148, 150 with a cursor 152 and drags the expense shapes 146, 148, 150 to the savings shape 144 as shown. For example, dotted lines between the original positions 146O, 148O, 150O and the displayed locations of the expense shapes 146, 148, 150 may indicate how the expense shapes 146, 148, 150 were selected and moved to the savings shape 144.

In the example of FIG. 1, the user's savings indicated by the savings shape 144 is sufficient to fund the expenses associated with the expense shapes 146, 148, 150. For example, the expense shapes 146, 148, 150 fit in the savings shape 144. A remainder of the savings shape 144 (e.g., that is not covered by the expense shapes 146, 148, 150) may provide the user 108 with an indication of the portion of the projected savings amount that is still available to fund other expenses. In some examples, where the savings indicated by the savings shape 144 is not sufficient to fund all of the expenses associated with the expense shapes 146, 148, 150, one or more of the expense shapes 146, 148, 150 may be displayed as ejected from the savings shape 144. (See FIG. 10).

Figure 2:
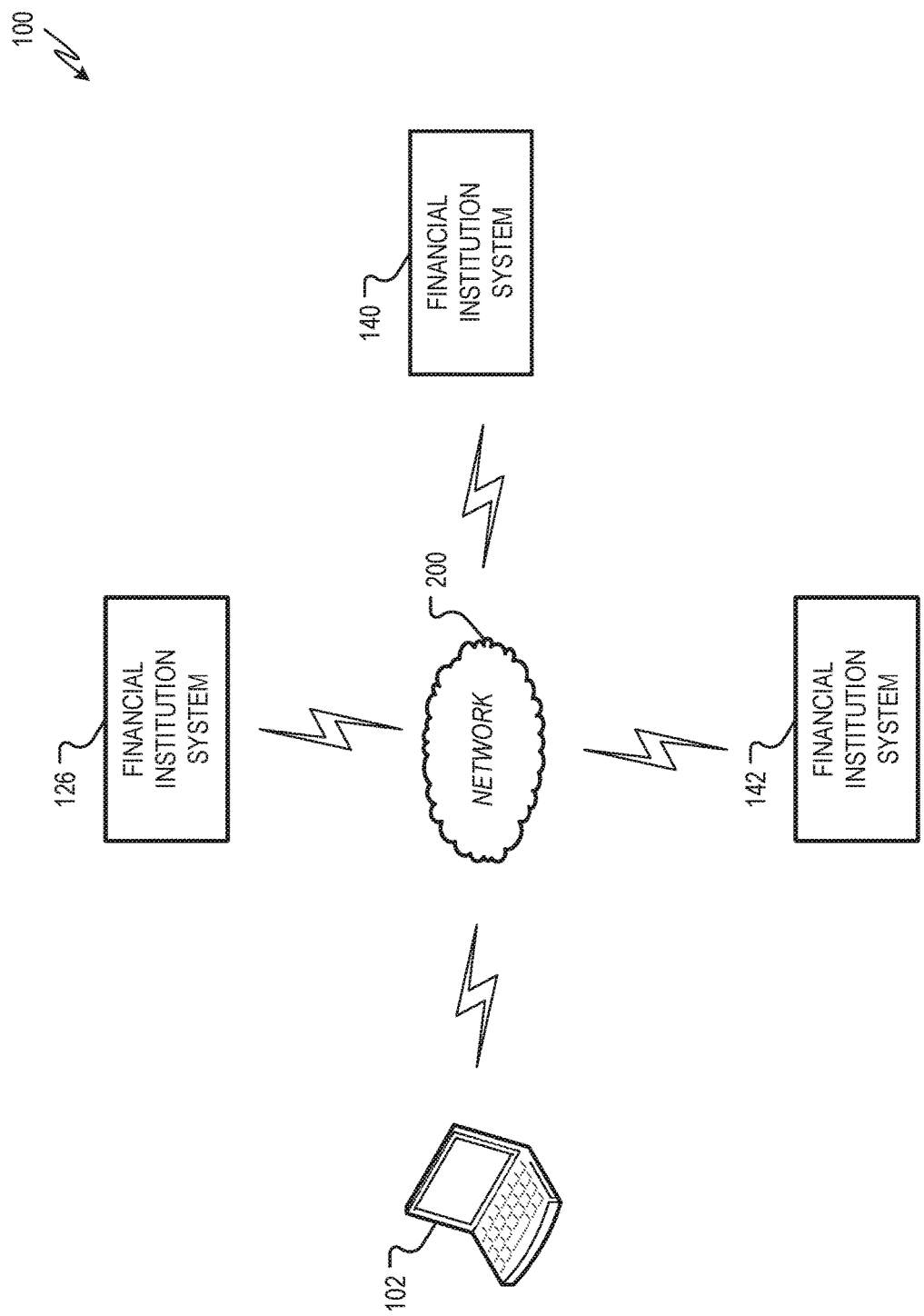
FIG. 2 is a diagram showing another example of the environment including additional details.

FIG. 2 is a diagram showing another example of the environment 100 including additional details. In the example of FIG. 2, the user computing device 102 and financial institution systems 126, 140, 142 are in communication with one another via a network 200. The network 200 may be or comprise any, suitable network element operated according to any suitable network protocol. For example, one or more portions of network 200 may be an ad hoc network, an intranet, an extranet, a virtual private network (VPN), a LAN, a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
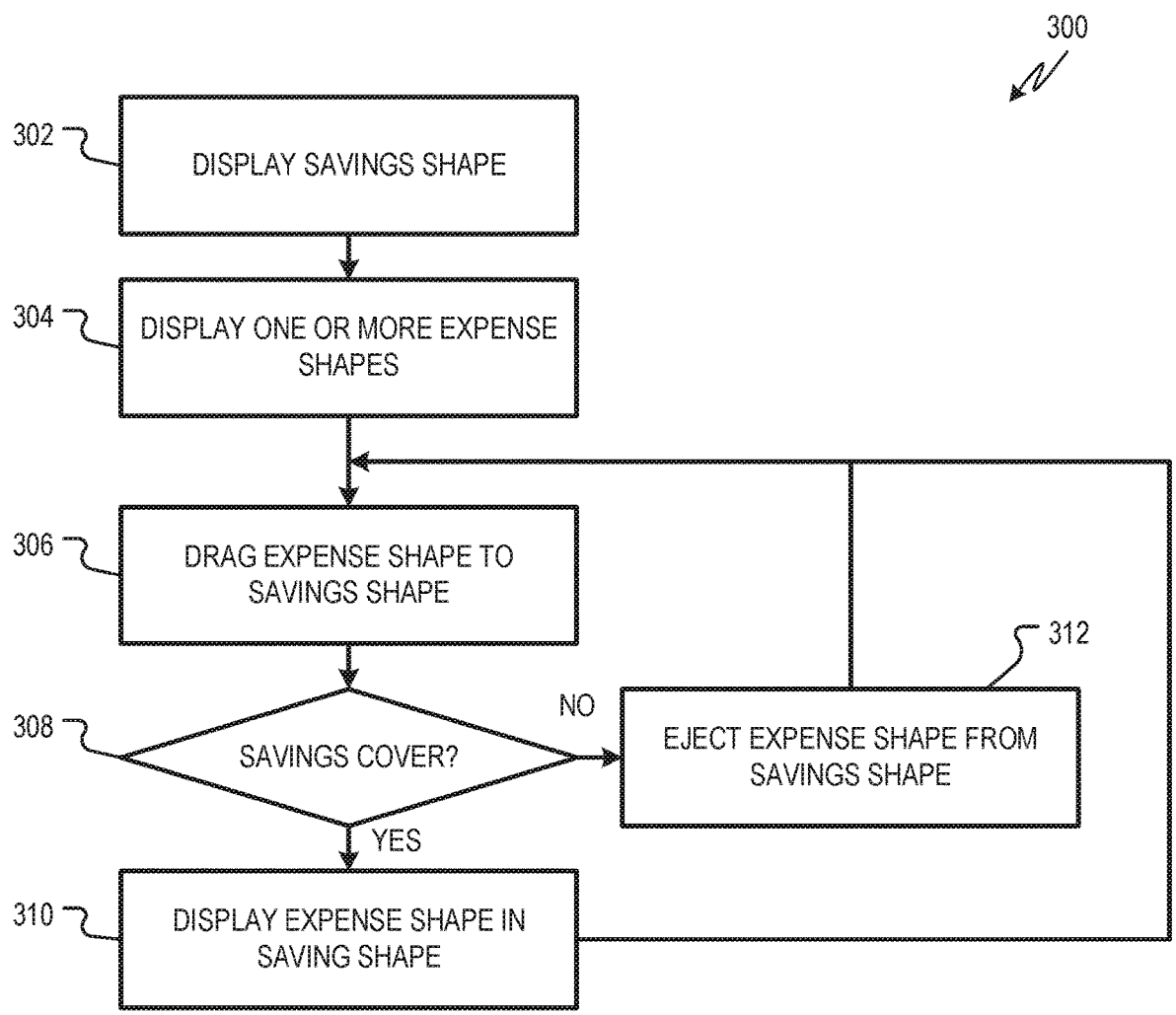
FIG. 3 is a flow chart showing one example of a process flow that may be executed to provide the user interface to the user.

FIG. 3 is a flow chart showing one example of a process flow 300 that may be executed to provide an example user interface (e.g., the UI 106) to a user (e.g., the user 108). The process flow 300 is described as being executed by a planning tool, such as the planning tool 114. In various examples, however, some or all of the process flow 300 may be executed by other various components such as, for example, one or more financial services systems, such as the financial institution systems 126, 140, 142.

At operation 302, the planning tool 114 may display a savings shape, such as the savings shape 144, to a user, such as the user 108. As described herein, the size of the savings shape may be based at least in part on a projected savings amount that the user projects to have saved. The projected savings amount may be expressed in any suitable manner such as, for example, a principle that the user projects to possess at retirement, etc. Also, in some examples, the projected savings amount may be a projected periodic savings amount indicating an amount that the user intends to save per instance of a time period, such as per month, per year, per bi-week, etc. In some examples, the size of the savings shape may be based on a projected period savings amount and a previously-saved amount. The previously-saved amount may indicate an amount that the user has already saved. The size of the savings shape that is based on the projected savings amount may be any suitable size or dimension of the savings shape such as, for example, a length, a width, a depth, an area, and/or a three-dimensional volume.

At operation 304, the planning tool may display one or more expense shapes, such as the expense shapes 146, 148, 150. The expense shapes 146, 148, 150 may have sizes that are based at least in part on an amount needed to meet expenses corresponding to the expense shapes. In some examples, the expense shapes are based on both the amount to meet the expenses and a time when the expenses occur. For example, the size of an expense shape may be proportional to a periodic amount to be saved to meet the expense. Consider an example where the user would like to buy a boat twenty years into the future. The size of the expense shape corresponding to the boat expense may be proportional to the amount that the user would have to save periodically (e.g., monthly) to have the purchase price of the boat twenty years from now. The sizes of the expense shapes that are based on the amount of the expense may be any suitable size or dimension of the savings shape such as, for example, a length, a width, a depth, an area, and/or a three-dimensional volume.

At operation 306, the planning tool may receive from the user an instruction to drag an expense shape to the savings shape. For example, the user may select the expense shape with a cursor, such as the cursor 152, and drag the expense shape towards the savings shape, in some examples, until at least part of the expense shape overlaps at least part of the savings shape. At operation 308, the planning tool may determine if the user's savings are sufficient to fund the expense corresponding to the expense shape. Because the sizes of the expense shape and the savings shape are based on an expense amount and a projected savings amount, respectively, the user may be able to estimate whether the expense can be funded by the savings by comparing the sizes of the two shapes. If the expense shape fits into the savings shape, it may indicate that the savings indicated by the savings amount are sufficient to fund the expense.

Figure 4:
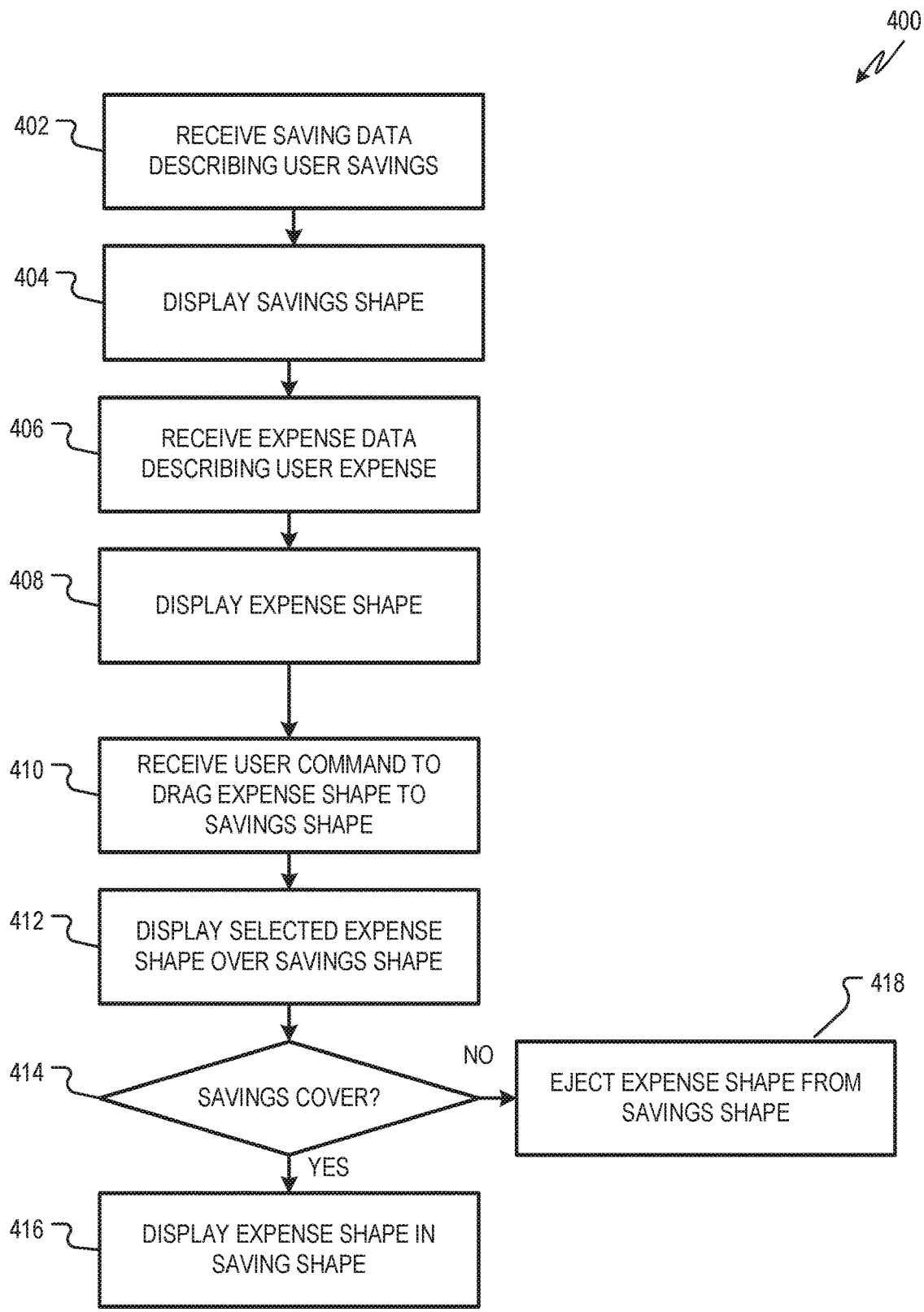
FIG. 4 is a flowchart showing another example of a process flow that may be executed to provide the user interface to the user.
Figure 9:
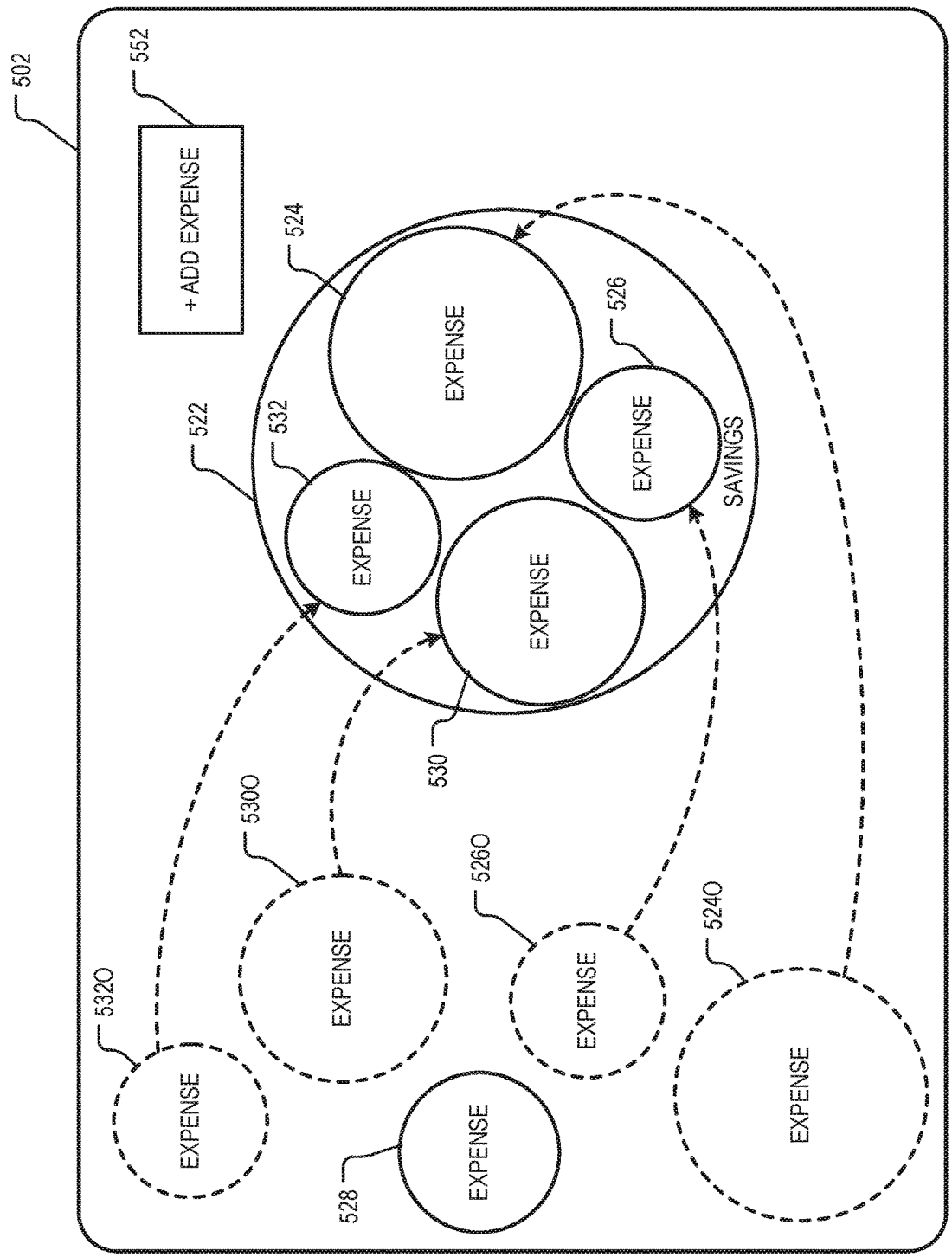
FIG. 9 is a screen shot showing a configuration of the screen of FIG. 5 with expense shapes positioned in the savings shape.
Figure 10:
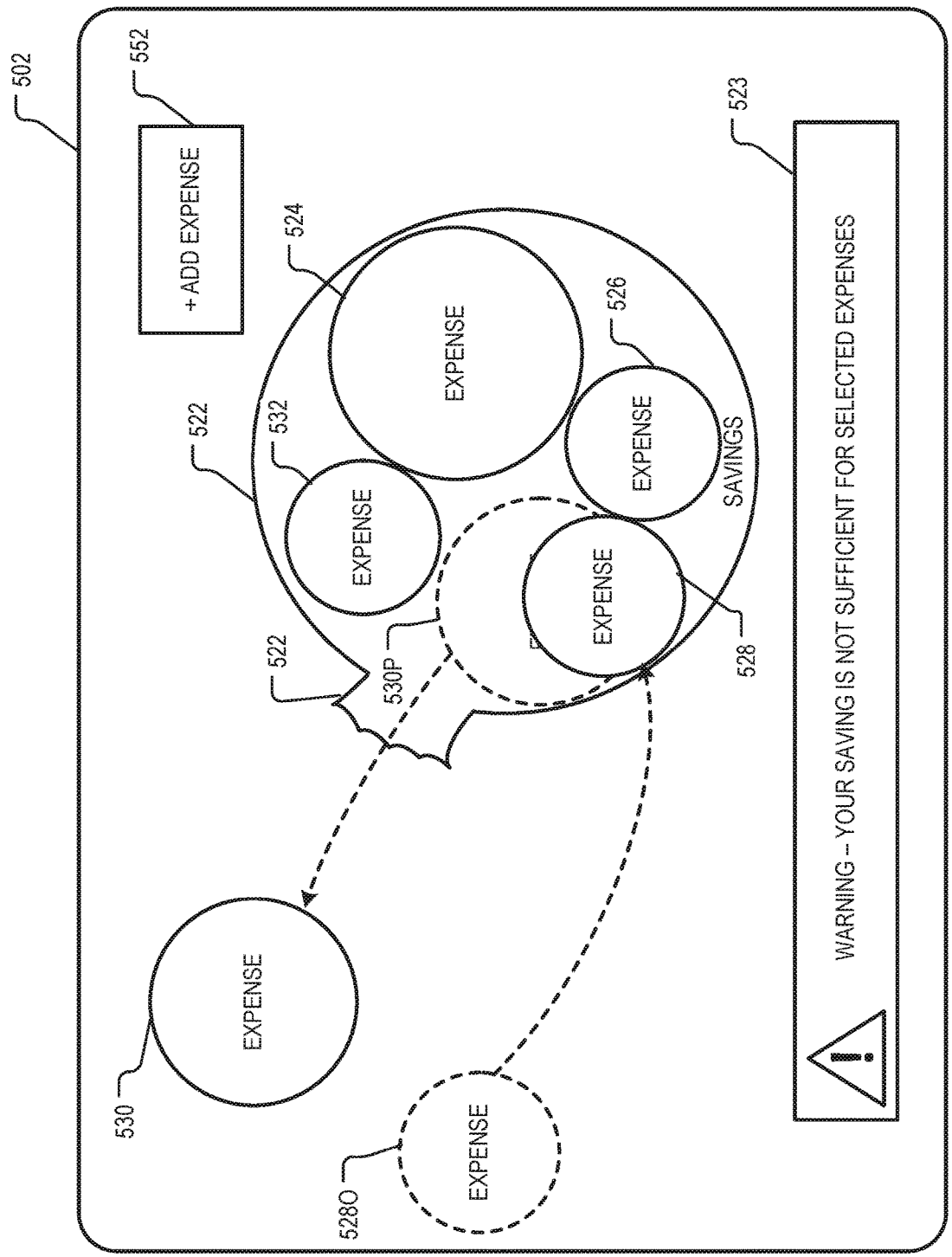
FIG. 10 is a screen shot showing a configuration of the screen of FIG. 5 with an expense shape shown ejected from the savings shape.

If the user's savings are not sufficient to fund the expense, the planning tool may eject the expense shape from the savings shape at operation 312, for example, as shown in FIG. 10. If the user's savings are sufficient to fund the expense, the planning tool may display the expense shape within the savings shape at operation 310. In some examples, the edges of the expense shape may be positioned within a perimeter of the savings shape, FIG. 4 is a flowchart showing another example of a process flow 400 that may be executed to provide the user interface to the user. Like the process flow 300, the process flow 400 is described as being executed by a planning tool, such as the planning tool 114. In various examples, however, some or all of the process flow 400 may be executed by other various components such as, for example, one or more financial services systems, such as the financial institution systems 126, 140, 142. Also, the process flow 400 is described as being executed in conjunction with the example user interface screen 502 shown in FIGS. 5-10. It will be appreciated, however, that the process flow 400 may be executed as described with other configurations of the UI.

At operation 402, the planning tool may receive savings data from a user, such as the user 108. Savings data may include a projected savings amount that indicates what the user projects to save. In some examples, the savings data includes a projected periodic savings amount. Also, in some examples, the savings data indicates an amount that the user has already saved, which may be considered in determining the size of the savings shape and whether the user's savings are sufficient to fund one or more expenses.

Figure 5:
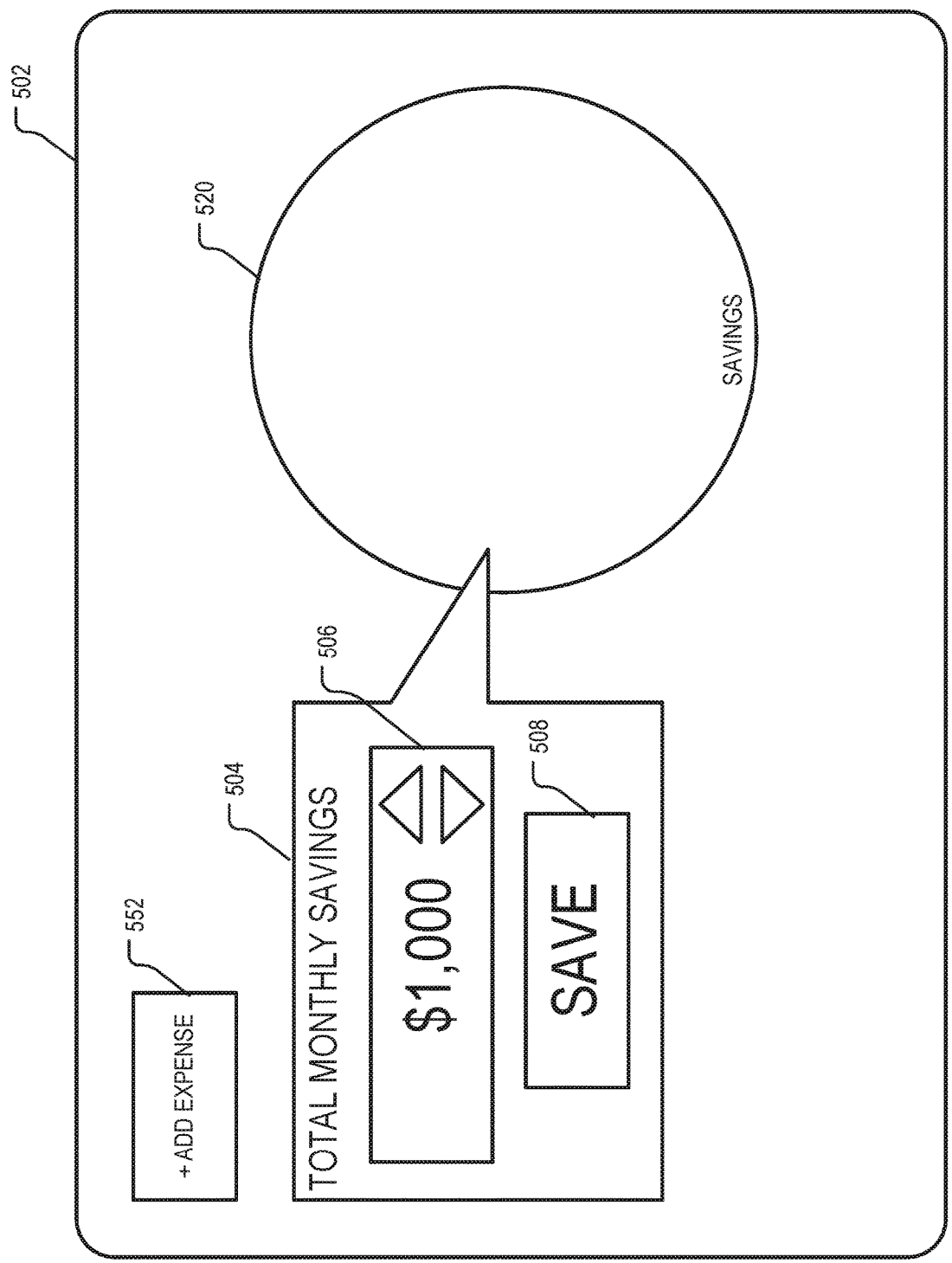
FIG. 5 is a screenshot showing one example of a screen that may be provided to the user as part of the UI described herein.

FIG. 5 is a screenshot showing one example of a screen 502 that may be Provided to the user as part of the UI described herein. In FIG. 5, the screen 502 shows a savings data entry field 504 where the user may provide savings data that is received by the planning tool. The savings data entry field 504 comprises a projected savings amount field 506 where the user may enter a projected savings amount. In the example of FIG. 5, the projected savings amount entered by the user is a projected periodic savings amount where the period is a month. The projected savings amount field 506 includes radio buttons that the user may select to raise or lower the projected savings amount by selecting the up arrow or the down arrow, respectively. The savings data entry field 504 also includes an example Save button 508 that may be selected by the user to provide the projected savings amount indicated at the projected savings amount field 506 to the planning tool.

Referring back to FIG. 4, at operation 404, the planning tool may display a savings shape. For example, at FIG. 5, the screen 502 includes an example savings shape 520. As described herein, the size of the savings shape 520 (e.g., length, height, width, area, volume, etc.) may indicate a projected periodic savings amount. In some examples, the size of the savings shape 520 is also based on previous savings of the user, if any. For example, if the user has previous savings, the size of the savings shape 520 may have two components, a previous savings component indicating the projected future value of the previous savings and a projected savings amount component.

Figure 6:
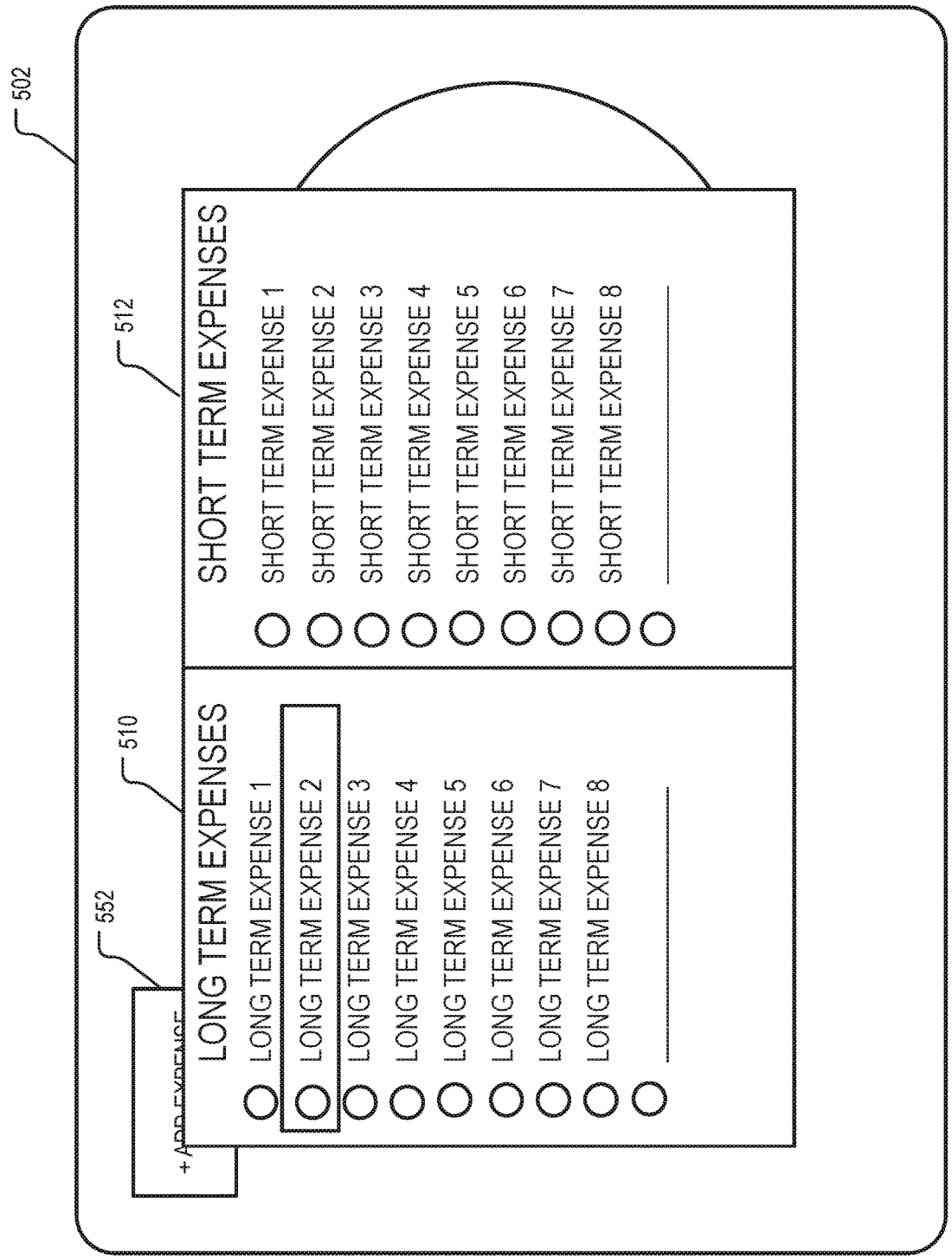
FIG. 6 is a screen shot showing another configuration of the screen of FIG. 5 configured to receive expense data.

At operation 406, the planning tool may receive expense data describing an expense of the user. The expense data may describe, for example, an amount of the expense and a date (or range of dates) over which the expense is to be incurred. Referring again to FIG. 5, the user may select an Add Expense button 552 to prompt the planning tool to receive the expense data, FIG. 6 is a screen shot showing another configuration of the screen 502 of FIG. 5 configured to receive expense data. For example, when the Add Expense button 552 is selected, the planning tool may display, at the screen 502, one or more expense entry fields 510, 512. In the example of FIG. 6, the screen 502 includes a long term expense entry field 510 and a short term expense entry field 512. The long term expense entry field 510 may include indications of a set of long term expenses that the user may wish to add to his or her plan. Similarly, the short term expense entry field 512 may include a set of short term expenses that the user may wish to add to his or her plan. The user may select one of the expenses. In the example of FIG. 6, the user has selected Long Term Expense 2. In some examples, the expense entry field 512 includes blank entries, as shown. In some examples, the customer may also provide a pre-saved amount (if any) associated with the goal. A pre-saved amount may indicate an amount that the customer has already saved that is specifically directed to the goal being entered.

Figure 7:
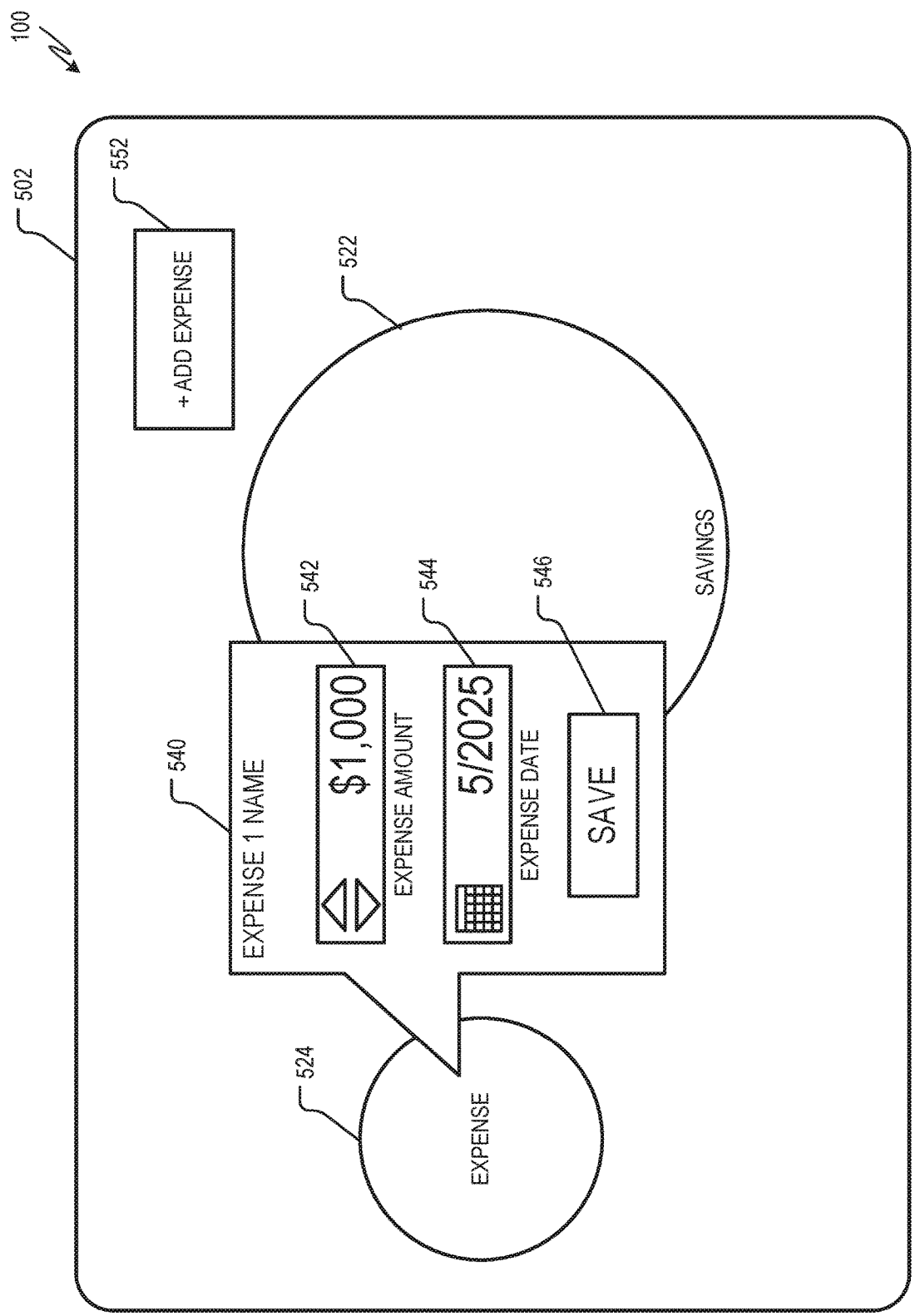
FIG. 7 is a screen shot showing yet another configuration of the screen of FIG. 5 including an expense entry field.

As described below, the planning tool may prepopulate one or more fields for receiving expense data based on the expense selected from the expense entry field 512. When the user selects a blank entry, the planning tool may not prepopulate any fields for receiving expense data, for example, providing the user with additional flexibility. In some examples, expense data for an expense may also indicate a priority of the expense. The priority may be used by the planning tool to determine the order in which expenses are ejected from the savings shape, if necessary. Any suitable criteria may be used to distinguish between long and short term expenses. For example, expenses with expense times more than a threshold time into the future may be displayed as long term expenses while expense times less than the threshold time into the future may be displayed as short term expenses, FIG. 7 is a screen shot showing yet another configuration of the screen 502 of FIG. 5 including an expense data entry field 540. The expense data entry field 540 may include an expense amount entry field 542, in which the user may provide an expense amount for the expense, and an expense date field 544 at which the user may provide a date when the expense is to be incurred. The expense date field 544 may receive a single date if the expense is to be incurred all at one time, or a range of dates if the expense is to be incurred over time. In some examples, the expense amount entry field 542 and the expense date field 544 may be pre-populated, for example, based on the expense that the user selected at the expense entry fields 510, 512.

Referring back to FIG. 4, at operation 408, the planning tool may display an expense shape 524 corresponding to the entered expense. A size of the expense shape 524 may be based at least in part on the expense amount. In some examples, described herein, the size of the expense shape 524 is also based on the date when the expense will be incurred. For example, the size of the expense shape may be based at least in part on (e.g., proportional to, a percentage of a predetermined maximum size, diameter per dollar, etc.) a periodic amount that the user would have to save to have the expense amount at the date when the expense will be incurred. In examples where the customer has a pre-saved amount that is to be spent on a particular expense, that pre-saved amount may be considered to lessen the size of the corresponding expense shape. For example, if the customer has already saved a pre-saved amount towards the expense, the current and future savings necessary to meet the expense (and thus the size of the expense shape 524) may be less. As described herein, a pre-saved amount may increase the size of the savings shape 524 or may decrease the size of an expense shape 524 to which the pre-saved amount is earmarked. In some examples, a pre-saved amount may be received with other expense data at operation 406.

In some examples, the size of an expense shape may be based on an assumed rate of return for the user's savings and/or a time until the corresponding expense is to be incurred. For example, consider an expense that involves purchasing a house ten years in the future. The size of the expense shape may reflect expected interest income on savings for the house during the ten year period until the user is to buy the house. In some examples, determining the expected interest income on savings, for example, may include, for example, determining an investment or investment class where periodic savings for that expense will be saved. The investment or investment class may be selected based on any suitable factor or factors including, for example, the length of time until the expense is to be incurred. For example, longer term expenses may utilize more illiquid (and often higher-yielding) investments.

Figure 8:
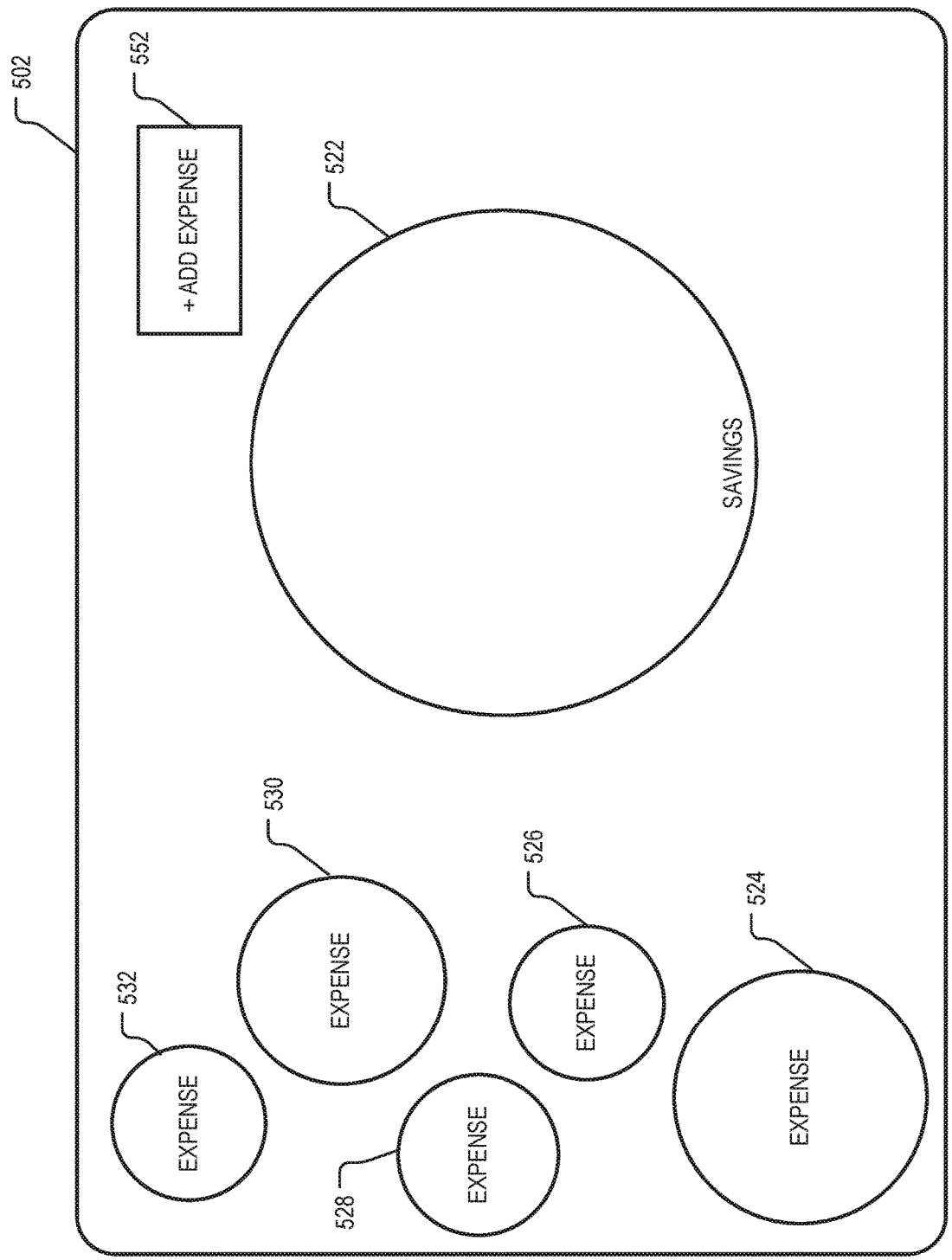
FIG. 8 is a screen shot showing another configuration of the screen of FIG. 5 including the savings shape and a set of expense shapes.

In some examples, the user selects the Add Expense button 552 again to add another expense, for example, at operations 406 and 408. FIG. 8 is a screen shot showing another configuration of the screen 502 of FIG. 5 including the savings shape 522 and a set of expense shapes 524, 526, 528, 530, 532. For example, the user may have selected the Add Expense button 552 and provided expense data at the screen 502 as shown in FIGS. 6 and 7 for each of the expense shapes 524, 526, 528, 530, 532.

Referring back to FIG. 4, at operation 410, the planning tool may receive a command from the user (e.g., a click of a button, a selection and dragging, etc.) to drag an expense shape, such as one of the expense shapes 524, 526, 528, 530, 532, to the savings shape 522. In response, the planning tool may display the selected expense shape over the savings shape 522 at operation 412. For example, the user may select an expense shape with a cursor and move the expense shape towards the savings shape 522. In other examples where the computing device includes a touch screen, the user may select the expense shape with a finger or stylus and slide the finger or stylus across the display towards the savings shape 522. At operation 414, the planning tool may determine if the user's savings are sufficient to fund the expense corresponding to the expense shape, if yes, the planning tool may display the selected expense shape in the savings shape at operation 416. If not, the planning tool may eject the expense shape from the savings shape at operation 418.

FIG. 9 is a screen shot showing a configuration of the screen 502 of FIG. 5 with expense shapes 524, 526, 530, 532 positioned in the savings shape 522. The original positions 524O, 526O, 530O, 532O of the expense shapes 524, 526, 530, 532 are also shown in dotted lines. The user may have selected the expense shapes 524, 526, 530, 532 one-by-one and instructed the planning tool to move them towards the savings shape 522. In the example shown in FIG. 9, the projected savings amount indicated by the savings shape 522 may have been sufficient to fund the expenses corresponding to the expense shapes 524, 526, 530, 532. This is indicated because the size of the savings shape 522 is sufficient to enclose the expense shapes 524, 526, 530, 532 without the expense shapes 524, 526, 530, 532 overlapping. The portion of the savings shape 522 that is not covered by an expense shape 524, 526, 530, 532 may be referred to as the remainder of the savings shape 522 and may be indicative of a portion of the projected savings amount that is available to fund additional expenses.

In FIG. 9, the expense shape 528 has not been placed in the savings shape 522. FIG. 10 is a screen shot showing a configuration of the screen 502 of FIG. 5 with an expense shape 530 shown ejected from the savings shape 522. In the example, the user has selected the expense shape 528 at its original position 528O and directed it towards the savings shape 522. The projected savings amount may not be sufficient to cover all of the expenses corresponding to expense shapes 524, 526, 528, 530, 532. Accordingly, the planning tool may modify the screen 502 to show one or more expense shapes ejected from the savings shape 522. In some examples, the planning tool may display an animation that shows the one or more expense shapes being ejected from the savings shape 522. For example, a side wall of the savings shape 522 may be shown to rupture as the one or more expense shapes are ejected.

In the example of FIG. 10, the expense shape 530 is ejected from its previous position 530P in the savings shape 522 outside of the savings shape 522. The planning tool may select an expense shape 524, 526, 528, 530, 532 to be ejected in any suitable manner. For example, the planning tool may eject the last expense shape that the user attempted to place in the savings shape 522. In other examples, the planning tool may eject the expense shape or shapes corresponding to the lowest priority expense or a combination of expenses that can be omitted to allow the projected savings amount to fund the expenses corresponding to the remaining expense shapes. In the example of FIG. 10, expense shape 530 is ejected, allowing the projected savings amount to fund the expenses corresponding to the remaining expense shapes 524, 526, 528, 532. In some examples, the planning tool may also display a warning screen 523 indicating to the user that the user's projected savings amount is not sufficient to fund the user's selected expenses.

In the example of FIG. 10, the savings shape 522 is depicted as "bursting" to eject the expense shape 530. In different examples, however, the expense shapes may be ejected from the savings shape 522 in different ways. In some examples, an animation may be provided depicting the expense shape being popped or forced out of the savings shape 522. In some examples, the ejected expense shape 530 may be simply moved from inside the savings shape 522 to outside of the savings shape 522. In some example, ejection may be depicted by a suitable animation.

Figure 11:
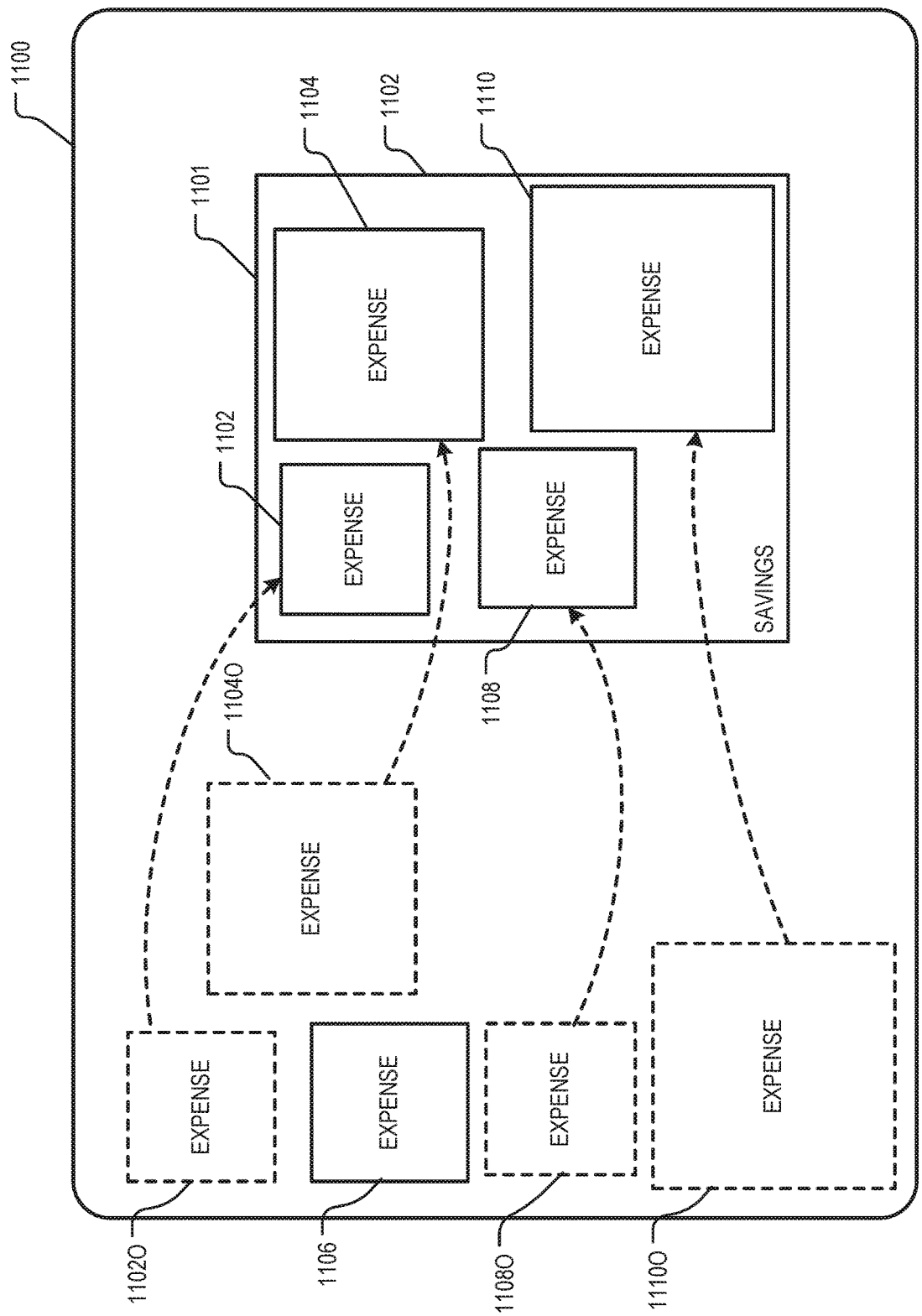
FIG. 11 is a screen shot showing an example of a screen that may be provided to the user as part of the UI disclosed herein and including square expense shapes and a square savings shape.

Also, although the savings shape 522 and the expense shapes 524, 526, 528, 530, 532 are circles, the planning tool may implement a UI with any suitable shape. For example, FIG. 11 is a screen shot showing an example of a screen 1100 that may be provided to the user as part of the UI disclosed herein and including square expense shapes 1102, 1104, 1106, 1108, 1110 and a square savings shape 1101. In the example depicted by the screen 1100, expense shapes 1102, 1104, 1108, and 1110 have been moved from original positions 1102O, 1104O, 1108O and 1110O to the savings shape 1101. Expense shape 1106 is positioned outside of the savings shape 1101.

Figure 12:
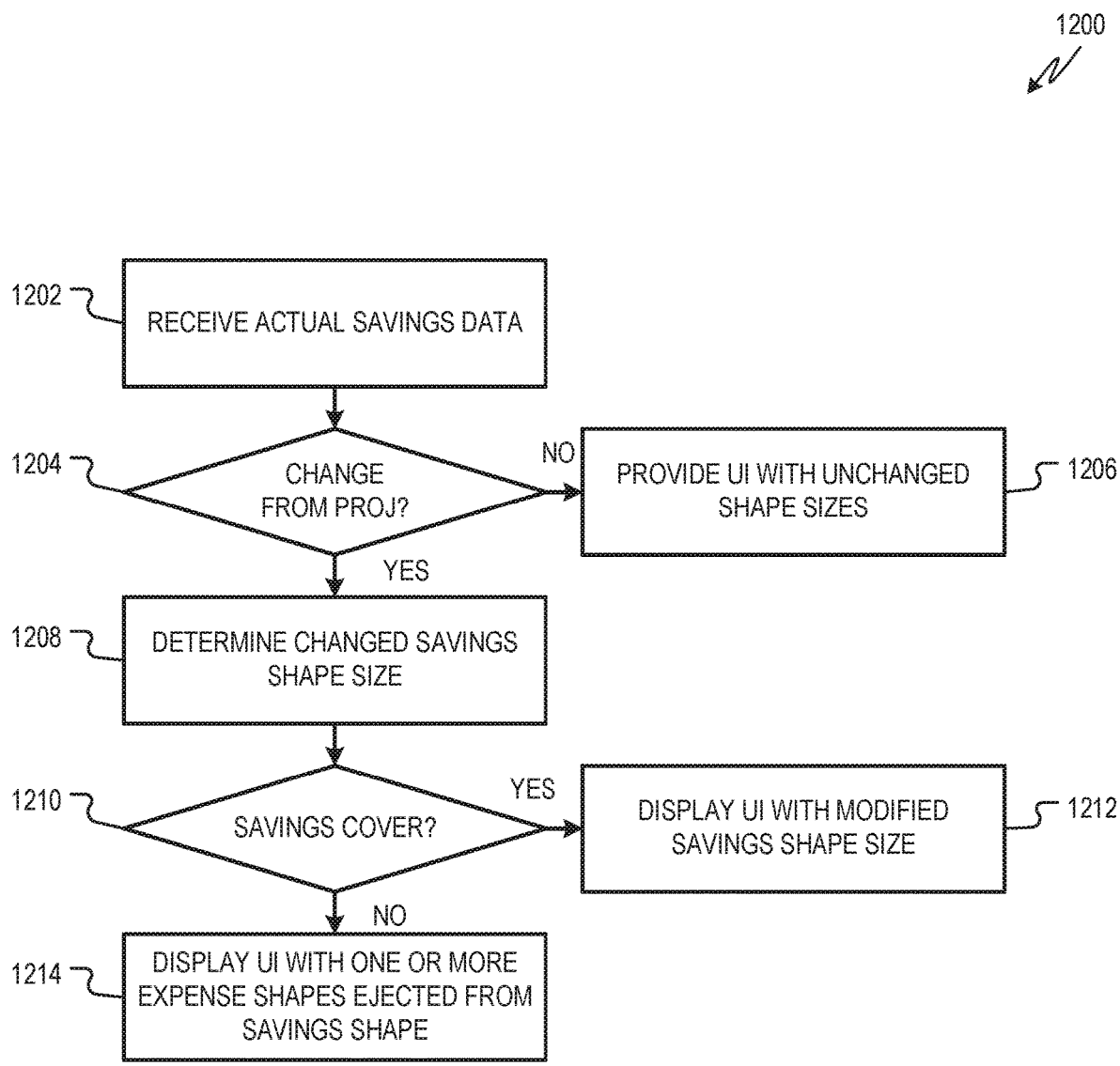
FIG. 12 is flowchart showing one example of a process flow that may be executed to provide the user interface, such as the user interface of FIG. 1, to a user, such as the user of FIG. 1.

FIG. 12 is flowchart showing one example of a process flow 1200 that may be executed to provide the user interface, such as the user interface 106, to a user, such as the user 108. The process flow 1200 is described as being executed by a planning tool, such as the planning tool 114. In various examples, however, some or all of the process flow 1200 may be executed by other various components such as, for example, one or more of the financial services systems, such as the financial institution systems 126, 140, 142.

The process flow 1200 shows one example way that the planning tool may modify the UI based on an actual savings amount of the user. For example, the user may provide the projected savings amount indicating what the user plans to save. The UI may be initially generated based on the projected savings amount. As time goes on, however, the user's actual savings amount may or may not match the projected savings amount. If the user's actual savings amount is larger than the projected savings amount, the user may be able to fund additional expenses that could not be funded with the projected savings amount. Similarly, if the user's actual savings amount is smaller than the projected savings amount, the user may not be able to actually fund the expenses that were previously selected.

At operation 1202, the planning tool may receive actual savings data. Actual savings data may describe an actual savings amount indicating what the user actually saved. Actual savings data may be provided to the planning tool in response to any suitable stimulus. For example, a financial institution system may push financial data indicating actual savings by the user to the planning tool. Also, in some examples, the user may request that the planning tool generate the UI based on actual savings data.

At operation 1204, the planning tool may determine if the actual savings amount is different than the projected savings amount. If there is no difference, the planning tool may provide the UI with sizes of the savings and expense shapes unchanged (e.g., unchanged from a previous version of the UI generated with the projected savings amount) at operation 1206. If the actual savings amount is different than the projected savings amount, the planning tool may determine a new size of the savings shape based at least in part on the actual savings amount at operation 1208. At operation 1210, the planning tool may determine if the actual savings amount is sufficient to fund the expenses corresponding to the expense shapes that were previously funded by the projected savings amount. If the actual savings amount is still sufficient, the planning tool may, at operation 1212, display the UI with the modified savings shape size determined at operation 1208.

If the actual savings amount is insufficient to fund the expenses corresponding to the expense shapes that were previously funded by the projected savings amount, the planning tool may, at operation 1214, display the UI with one or more expense shapes ejected from the savings shape. Actual savings may be insufficient to fund the expenses previously funded by the projected savings amount, for example, if the customer has not actually saved at the projected savings amount, if the actual rate of return is less than the assumed rate of return, etc.

Figure 13:
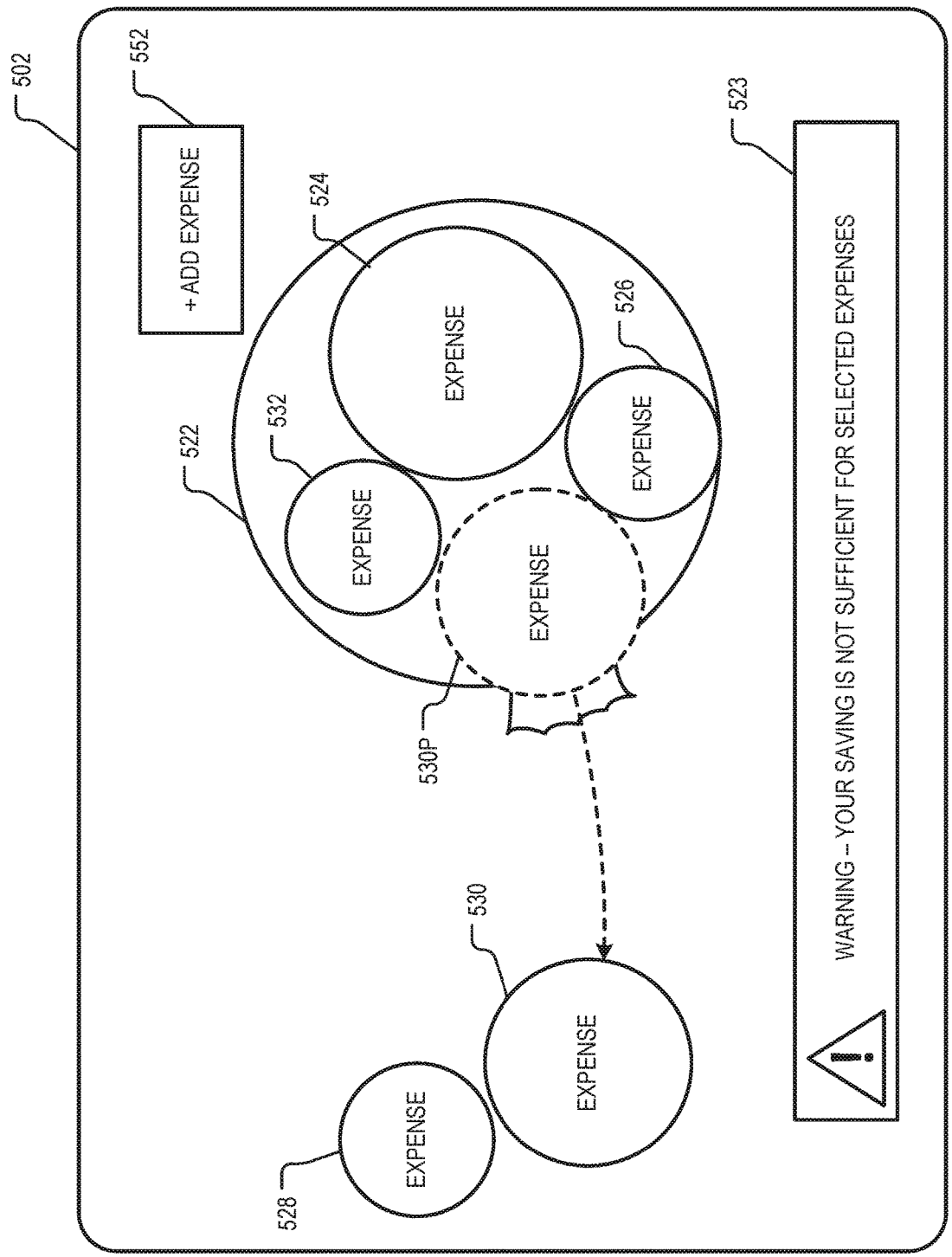
FIG. 13 is a screen showing a configuration of the screen of FIG. 5 showing an expense shape ejected from the savings shape after the savings shape is made smaller in response to an actual savings amount.

FIG. 13 is a screen showing a configuration of the screen 502 of FIG. 5 showing an expense shape 530 ejected from the savings shape 522 after the savings shape 522 is made smaller in response to an actual savings amount. In the example of FIG. 13, the actual savings amount may have been less than the projected savings amount, prompting a reduction in the size of the savings shape 522. Also, the actual savings amount may not have been sufficient to fund the expenses corresponding to the expense shapes 524, 526, 530, 532 that were previously funded by the projected savings amount. In the example of FIG. 13, the expense shape 530 is ejected from its previous position 530P, although the planning tool may choose to eject an expense shape corresponding to any expense or combination of expenses, as described herein.

Figure 14:
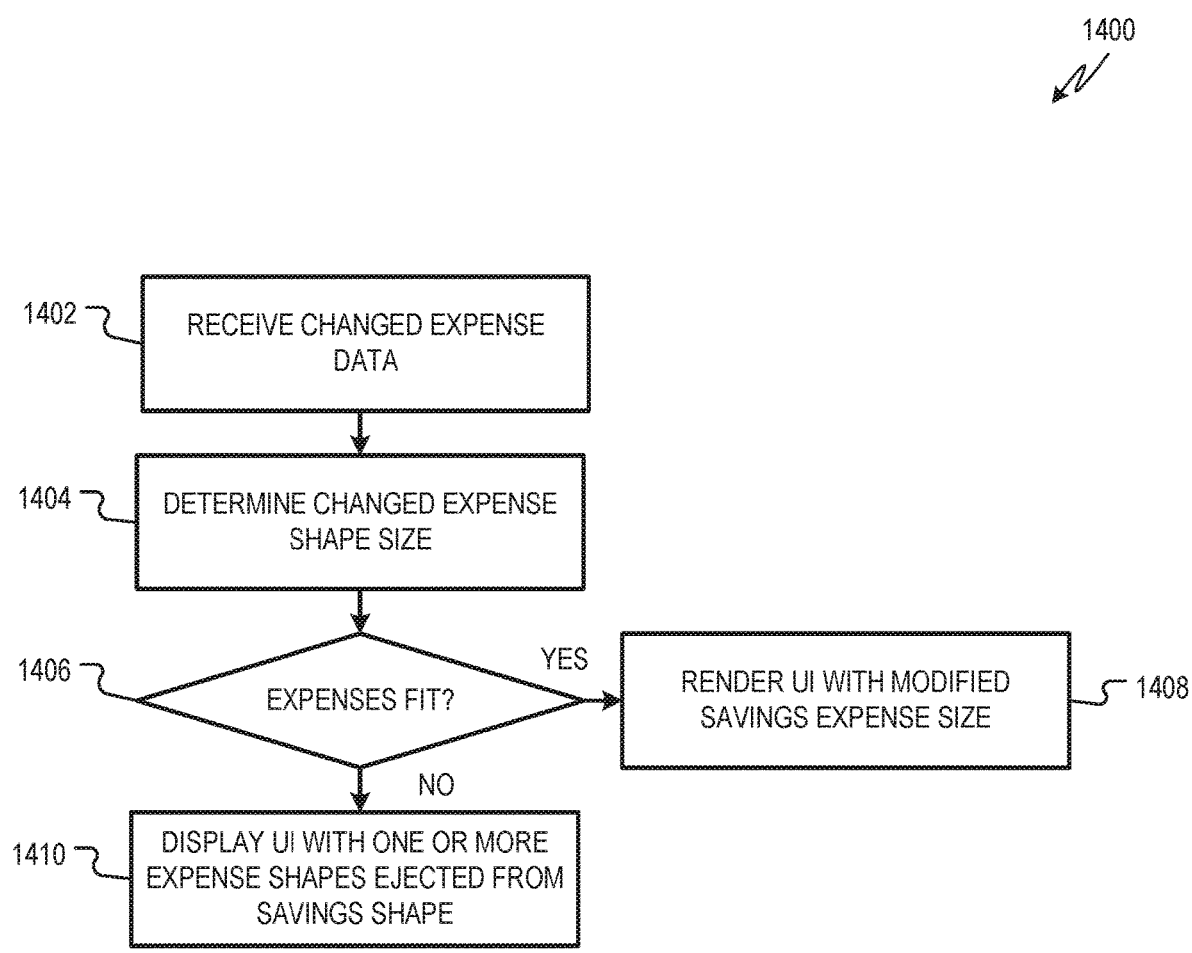
FIG. 14 is a flow chart showing one example of a process flow that may be executed to provide the user interface as described herein to a user.

FIG. 14 is a flow chart showing one example of a process flow 1400 that may be executed to provide the user interface, such as the user interface 106, to a user, such as the user 108. The process flow 1400 is described as being executed by a planning tool, such as the planning tool 114. In various examples, however, some or all of the process flow 1400 may be executed by other various components such as, for example, one or more financial services systems, such as the financial institution systems 126, 140, 142.

The process flow 1400 shows an example where the user modifies an expense amount or an expense time of an expense. For example, this may cause the expense to no longer be funded by the projected savings amount (e.g., if the expense amount is made larger or the time it is incurred sooner), and/or may permit the expense or other expenses to be funded by the projected savings amount (e.g., if the expense amount is made smaller or the time it is incurred later).

At operation 1402, the planning tool may receive changed expense data indicating that there has been change to at least one previously-entered expense. At operation 1404, the planning tool may determine a changed size for the expense shape corresponding to the changed expense. At operation 1406, the planning tool may determine if the projected savings amount is sufficient to fund the changed expense. If yes, at operation 1408, the planning tool may provide the UI with a changed expense shape having a size reflecting the change to the changed expense. The user may then, for example, add the changed expense shape to the savings shape (e.g., if the changed expense shape was not previously in the savings shape), add more expense shapes to the savings shape, or take another suitable action. If the projected savings amount is not sufficient to fund the expenses including the changed expense, the planning tool may eject an expense shape from the savings shape at operation 1410.

Figure 15:
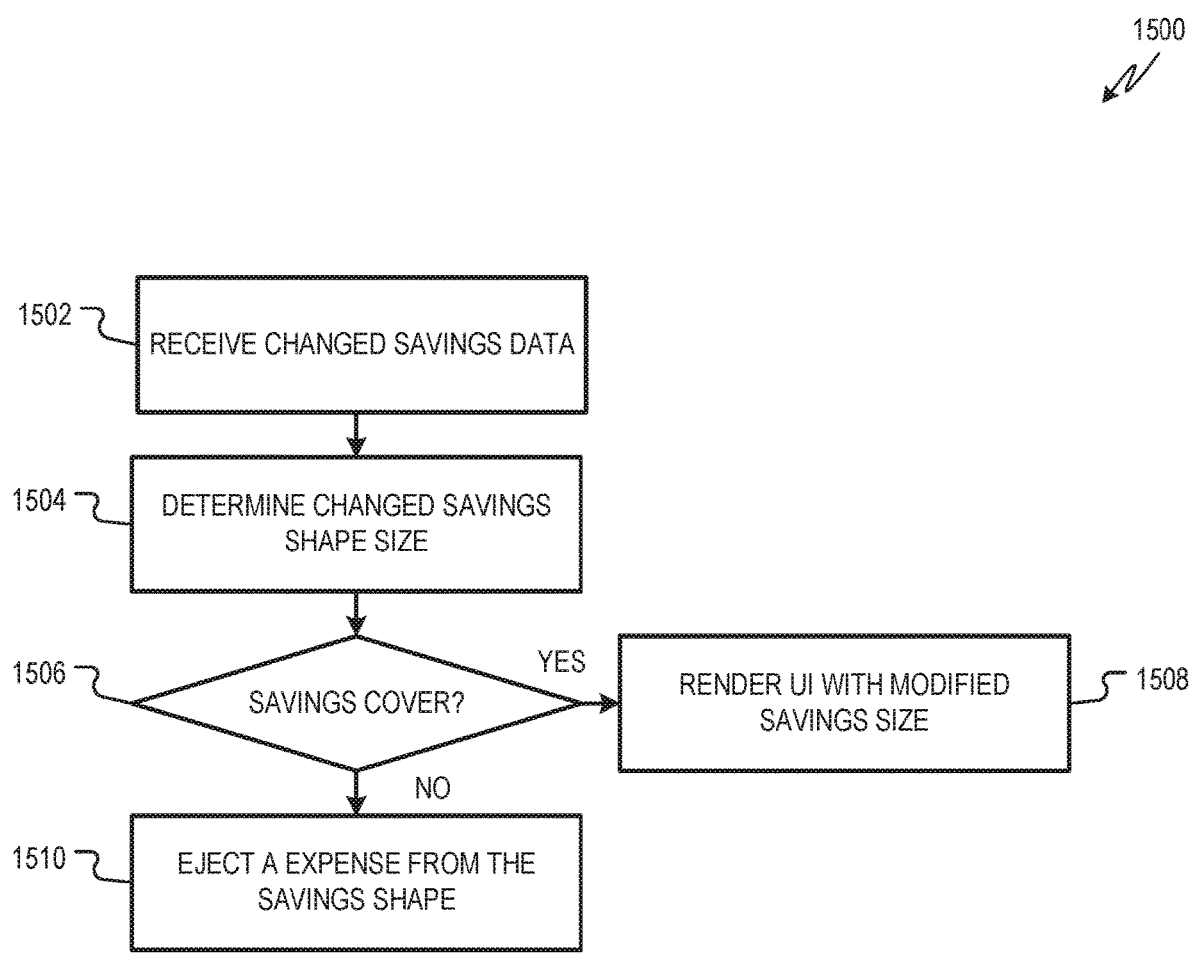
FIG. 15 is a flow chart showing another example of a process flow that may be executed to provide the user interface as described herein to a user.

FIG. 15 is a flow chart showing one example of a process flow 1500 that may be executed to provide the user interface, such as the user interface 106, to a user, such as the user 108. The process flow 1500 is described as being executed by a planning tool, such as the planning tool 114. In various examples, however, some or all of the process flow 1500 may be executed by other various components such as, for example, one or more financial services systems, such as the financial institution systems 126, 140, 142.

The process flow 1500 shows an example where the user modifies the projected savings amount. For example, this may cause one or more expenses to no longer be funded by the changed projected savings amount (e.g., if the changed projected savings amount is smaller than the previous projected savings amount), and/or may permit additional expenses to be funded by the projected savings amount (e.g., if the changed projected savings amount is higher than the previous projected savings amount).

At operation 1502, the planning tool may receive changed savings data indicating that there has been change to the projected savings amount. At operation 1504, the planning tool may determine a changed size for the savings shape. At operation 1506, the planning tool may determine if the changed projected savings amount is sufficient to fund previously-funded expenses. If yes, at operation 1508, the planning tool may provide the UI with a changed savings shape having a size reflecting the changed savings amount. The user may then, for example, add new expense shapes to the changed savings shape, remove expense shapes from the changed savings shape, and/or take another suitable action. If the changed projected savings amount is not sufficient to fund previously-funded expenses, the planning tool may eject an expense shape from the savings shape at operation 1510.

Figure 16:
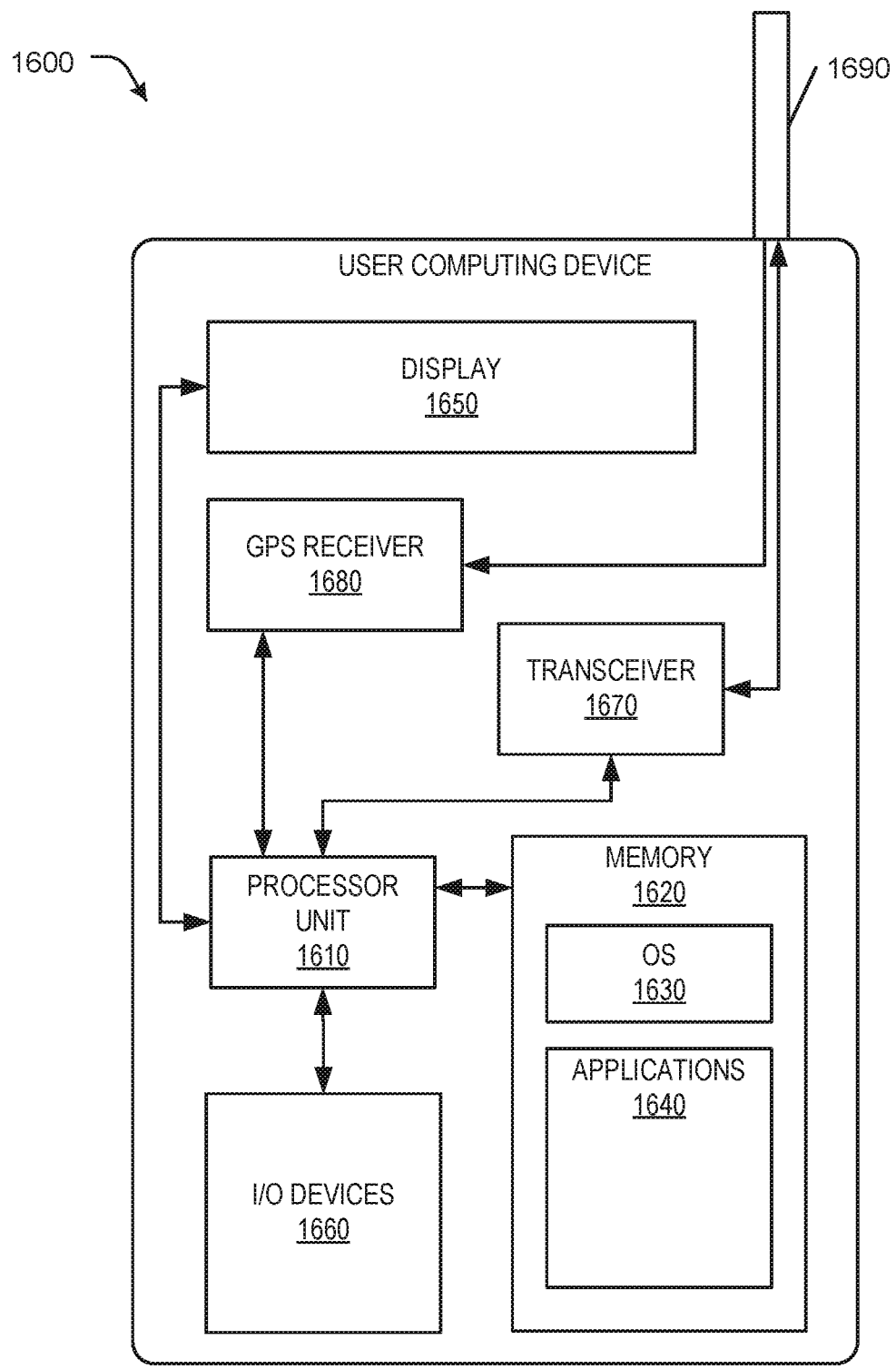
FIG. 16 is a block diagram showing an example architecture of a user computing device.

FIG. 16 is a block diagram showing an example architecture 1600 of a user computing device. The architecture 1600 may, for example, describe any of the computing devices described herein, including, for example, the user computing device 102. The architecture 1600 comprises a processor unit 1610. The processor unit 1610 may include one or more processors. Any of a variety of different types of commercially available processors suitable for user computing devices may be used (for example, an XScale architecture microprocessor, a Microprocessor without Interlocked Pipeline Stages (MIPS) architecture processor, or another type of processor). A memory 1620, such as a Random Access Memory (RAM), a flash memory, or another type of memory or data storage, is typically accessible to the processor. The memory 1620 may be adapted to store an operating system (OS) 1630, as well as application programs 1640.

The processor unit 1610 may be coupled, either directly or via appropriate intermediary hardware, to a display 1650 and to one or more input/output (I/O) devices 1660, such as a keypad, a touch panel sensor, a microphone, and the like. Such I/O devices 1660 may include a touch sensor for capturing fingerprint data, a camera for capturing one or more images of the user, a retinal scanner, or any other suitable devices. Similarly, in some examples, the processor unit 1610 may be coupled to a transceiver 1670 that interfaces with an antenna 1690. The transceiver 1670 may be configured to both transmit and receive cellular network signals, wireless data signals, or other types of signals via the antenna 1690, depending on the nature of the user computing device implemented by the architecture 1600. Although one transceiver 1670 is shown, in some examples, the architecture 1600 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 1680 may also make use of the antenna 1690 to receive GPS signals. In addition to or instead of the GPS receiver 1680, any suitable location-determining sensor may be included and/or used, including, for example, a Wi-Fi positioning system. In some examples, the architecture 1600 (e.g., processor unit 1610) may also support a hardware interrupt. In response to a hardware interrupt, the processor unit 1610 may pause its processing and execute an interrupt service routine (ISR).

Figure 17:
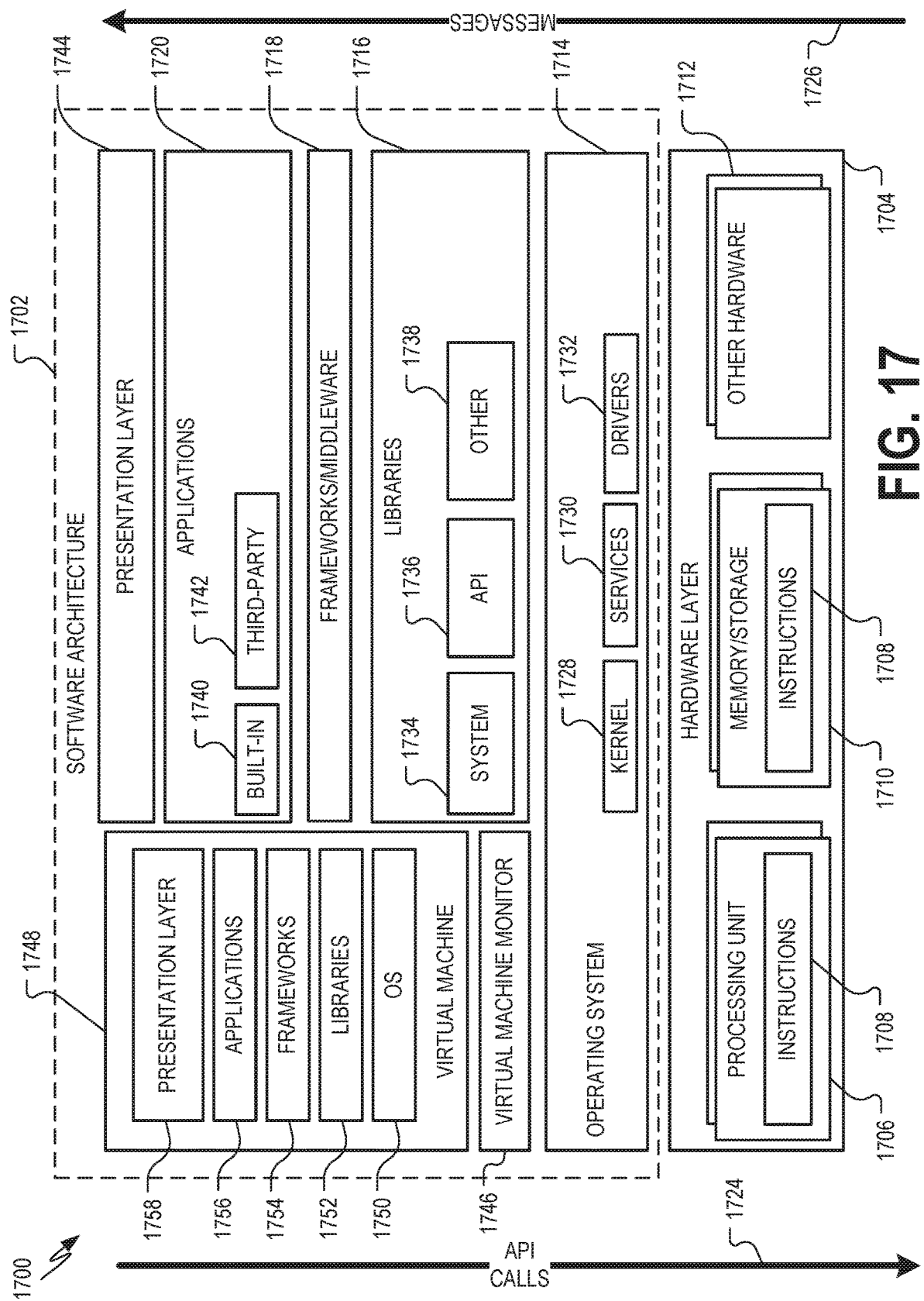
FIG. 17 is a block diagram showing one example of a software architecture for a computing device.

FIG. 17 is a block diagram 1700 showing one example of a software architecture 1702 for a computing device. The software architecture 1702 maybe used in conjunction with various hardware architectures, for example, as described herein. FIG. 17 is merely a non-limiting example of a software architecture 1702 and many other architectures may be implemented to facilitate the functionality described herein. A representative hardware layer 1704 is illustrated and can represent, for example, any of the above-referenced computing devices. In some examples, the hardware layer 1704 may be implemented according to an architecture 1800 of FIG. 18 and/or the architecture 1600 of FIG. 16.

The representative hardware layer 1704 comprises one or more processing units 1706 having associated executable instructions 1708. The executable instructions 1708 represent the executable instructions of the software architecture 1702, including implementation of the methods, modules, components, and so forth of FIGS. 1-15. The hardware layer 1704 also includes memory and/or storage modules 1710, which also have the executable instructions 1708. The hardware layer 1704 may also comprise other hardware 1712, which represents any other hardware of the hardware layer 1704, such as the other hardware illustrated as part of the architecture 1800.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and a presentation layer 1744. Operationally, the applications 1720 and/or other components within the layers may invoke API calls 1724 through the software stack and receive a response, returned values, and so forth illustrated as messages 1726 in response to the API calls 1724. The layers illustrated are representative in nature and not all software architectures have all layers. For example, some mobile or special-purpose operating systems may not provide a frameworks/middleware 1718 layer, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. In some examples, the services 1730 include an interrupt service. The interrupt service may detect the receipt of a hardware or software interrupt and, in response, cause the software architecture 1702 to pause its current processing and execute an ISR when an interrupt is received. The ISR may generate an alert.

The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1716 may provide a common infrastructure that may be utilized by the applications 1720 and/or other components and/or layers. The libraries 1716 typically provide functionality that allows other software modules to perform tasks in an easier fashion than by interfacing directly with the underlying operating system 1714 functionality (e.g., kernel 1728, services 1730, and/or drivers 1732). The libraries 1716 may include system libraries 1734 (e.g., C standard library) that may provide functions such as memory allocation functions, string manipulation functions, mathematic functions, and the like. In addition, the libraries 1716 may include API libraries 1736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries WebKit that may provide web browsing functionality), and the like. The libraries 1716 may also include a wide variety of other libraries 1738 to provide many other APIs to the applications 1720 and other software components/modules.

The frameworks 1718 (also sometimes referred to as middleware) may provide a higher-level common infrastructure that may be utilized by the applications 1720 and/or other software components/modules. For example, the frameworks 1718 may provide various graphical user interface (GUI) functions, high-level resource management, high-level location services, and so forth. The frameworks 1718 may provide a broad spectrum of other APIs that may be utilized by the applications 1720 and/or other software components/modules, some of which may be specific to a particular operating system or platform.

The applications 1720 include built-in applications 1740 and/or third-party applications 1742. Examples of representative built-in applications 1740 may include, but are not limited to, a contacts application, a browser application, a book reader application, a location application, a media application, a messaging application, and/or a game application. The third-party applications 1742 may include any of the built-in applications 1740 as well as a broad assortment of other applications. In a specific example, the third-party application 1742 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 1742 may invoke the API calls 1724 provided by the mobile operating system such as the operating system 1714 to facilitate functionality described herein.

The applications 1720 may utilize built-in operating system functions (e.g., kernel 1728, services 1730, and/or drivers 1732), libraries (e.g., system libraries 1734, API libraries 1736, and other libraries 1738), or frameworks/middleware 1718 to create user interfaces to interact with users of the system. Alternatively, or additionally, in some systems, interactions with a user may occur through a presentation layer, such as the presentation layer 1744. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 17, this is illustrated by a virtual machine 1748. A virtual machine creates a software environment where applications/modules can execute as if they were executing on a hardware computing device. The virtual machine 1748 is hosted by a host operating system (e.g., operating system 1714) and typically, although not always, has a virtual machine monitor 1746, which manages the operation of the virtual machine 1748 as well as the interface with the host operating system (e.g., operating system 1714). A software architecture executes within the virtual machine 1748, such as an operating system 1750, libraries 1752, frameworks/middleware 1754, applications 1756, and/or a presentation layer 1758. These layers of software architecture executing within the virtual machine 1748 can be the same as corresponding layers previously described or may be different.

Figure 18:
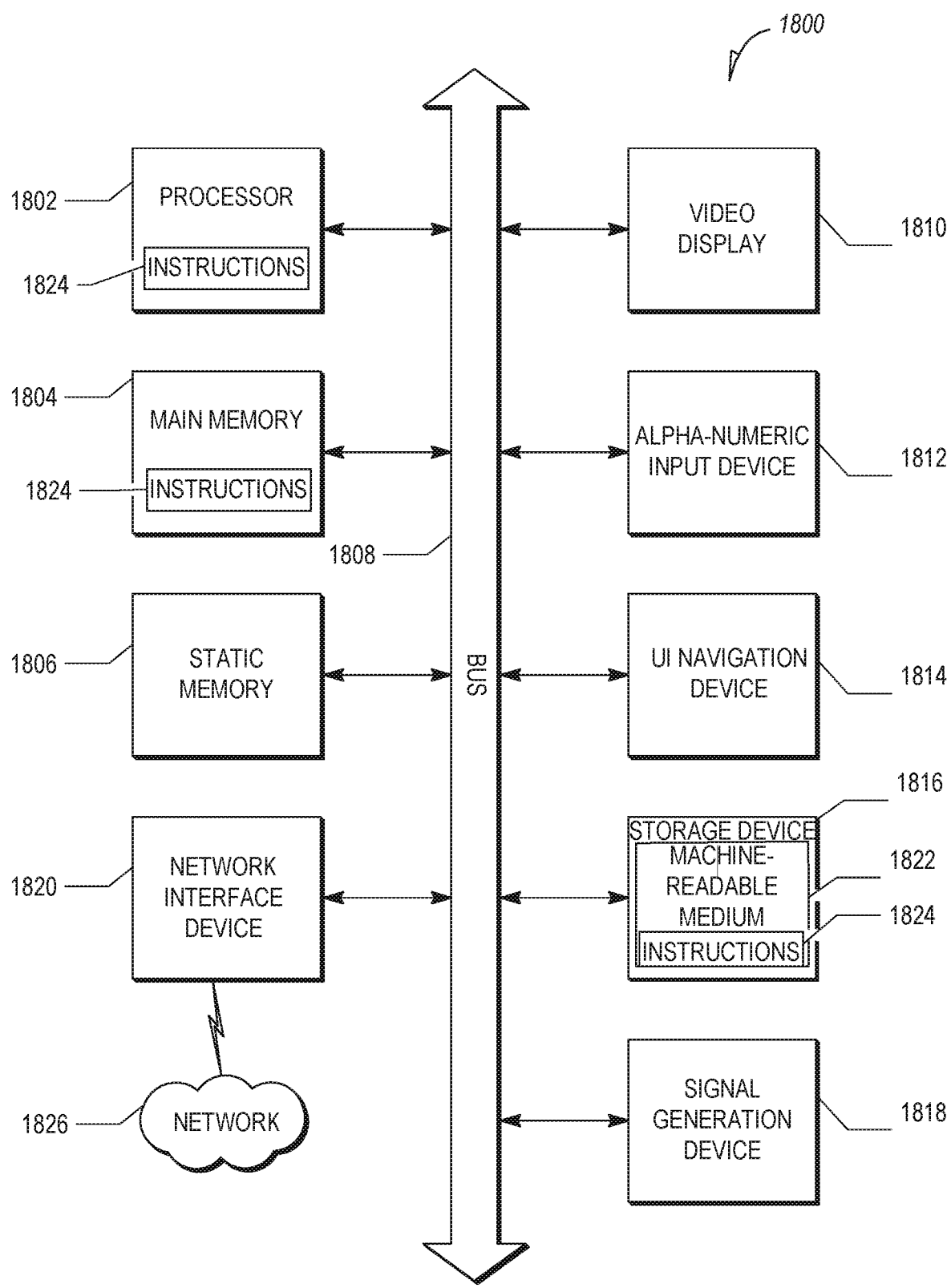
FIG. 18 is a block diagram illustrating a computing device hardware architecture, within which a set or sequence of instructions can be executed to cause a machine to perform examples of any one of the methodologies discussed herein.

FIG. 18 is a block diagram illustrating a computing device hardware architecture 1800, within which a set or sequence of instructions can be executed to cause a machine to perform examples of any one of the methodologies discussed herein. The architecture 1800 may describe, for example, any of the network-enabled devices herein as well as, for example, the user computing device 102 and/or one or more of the financial institution systems 126, 140, 142.

The architecture 1800 may execute the software architecture 1702 described with respect to FIG. 17. The architecture 1800 may operate as a standalone device or may be connected (e.g., networked) to other machines. In a networked deployment, the architecture 1800 may operate in the capacity of either a server or a client machine in server-client network environments, or it may act as a peer machine in peer-to-peer (or distributed) network environments. The architecture 1800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1800 includes a processor unit 1802 comprising at least one processor (e.g., a central processing unit (CPU), a graphics processing unit (GPU), or both, processor cores, compute nodes, etc.). The architecture 1800 may further comprise a main memory 1804 and a static memory 1806, which communicate with each other via a link 1808 (e.g., bus). The architecture 1800 can further include a video display unit 1810, an alphanumeric input device 1812 (e.g., a keyboard), and a UI navigation device 1814 (e.g., a mouse). In some examples, the video display unit 1810, alphanumeric input device 1812, and UI navigation device 1814 are incorporated into a touchscreen display. The architecture 1800 may additionally include a storage device 1816 (e.g., a drive unit), a signal generation device 1818 (e.g., a speaker), a network interface device 1820, and one or more sensors (not shown), such as a GPS sensor, compass, accelerometer, or other sensor.

In some examples, the processor unit 1802 or another suitable hardware component may support a hardware interrupt. In response to a hardware interrupt, the processor unit 1802 may pause its processing and execute an ISR, for example, as described herein.

The storage device 1816 includes a machine-readable medium 1822 on which is stored one or more sets of data structures and instructions 1824 (e.g., software) embodying or utilized by any one or more of the methodologies or functions described herein. The instructions 1824 can also reside, completely or at least partially, within the main memory 1804, within the static memory 1806, and/or within the processor unit 1802 during execution thereof by the architecture 1800, with the main memory 1804, the static memory 1806, and the processor unit 1802 also constituting machine-readable media. The instructions 1824 stored at the machine-readable medium 1822 may include, for example, instructions for implementing the software architecture 1702, instructions for executing any of the features described herein, etc.

While the machine-readable medium 1822 is illustrated in an example to be a single medium, the term "machine-readable medium" can include a single medium or multiple media (e.g., a centralized or distributed database, and/or associated caches and servers) that store the one or more instructions 1824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1824 can further be transmitted or received over a communications network 1826 using a transmission medium via the network interface device 1820 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for interfacing with a user, the system comprising:
   a computing device comprising a processor unit and a display, wherein the computing device is programmed to perform operations comprising:
   displaying, in the display, a graphical user interface (GUI), wherein the GUI comprises:
      a savings shape indicating a savings amount;
      a first expense shape indicating a first expense of the user; and
      a second expense shape indicating a second expense of the user;
   receiving from the user an instruction from the user to place the first expense shape within the savings shape;
   responsive to receiving the instruction:
      displaying the first expense shape at least partially overlaying the savings shape; and
      determining that the savings amount is not sufficient to fund the first expense; and
   responsive to determining that the savings amount is not sufficient to fund the first expense, displaying, in the GUI, the first expense shape passing through a boundary of the savings shape to a position outside the savings shape.

2. The system of claim 1, wherein a size of the first expense shape is based at least in part on a periodic amount that the user would need to save per instance of a time period to have an amount of the first expense at a first expense time.

3. The system of claim 1, the operations further comprising:
   accessing second expense data describing the second expense of the user, wherein the second expense data indicates an amount of the second expense;
   receiving from the user an instruction to place the second expense shape within the savings shape;
   responsive to receiving the instruction to place the second expense shape within the savings shape:
      displaying the second expense shape at least partially overlaying the savings shape; and
      determining that the savings amount is sufficient to fund the second expense; and
   responsive to determining that savings amount is sufficient to fund the second expense, displaying, in the GUI, the second expense shape positioned within the savings shape.

4. The system of claim 3, wherein the savings shape has a size based at least in part on a projected savings amount of the user, and wherein a size of a remainder of the savings shape that is not covered by the second expense shape is indicative of a remainder of the savings amount that is left over after funding the second expense.

5. The system of claim 1, the operations further comprising:
determining, by the computing device, a second size for the savings shape using actual savings data describing an actual savings amount; and
changing, by the computing device, the savings shape to the second size.

6. The system of claim 5, the operations further comprising, responsive to an indication that the actual savings amount is sufficient to fund the first expense, displaying, in the GUI, the first expense shape within the savings shape.

7. The system of claim 1, wherein a size of the savings shape describes at least one of an area of the savings shape or a volume of the savings shape.

8. The system of claim 1, the operations further comprising:
modifying, by the computing device in the GUI, a size of the first expense shape based at least in part on first changed expense data describing a change to the first expense;
determining, by the computing device, that the savings amount is sufficient to fund the first expense based at least in part on the first changed expense data; and
displaying, in the GUI, the first expense shape within the savings shape.

9. The system of claim 1, the operations further comprising:
modifying, by the computing device, a size of the savings shape based at least in part on changed savings data describing a changed savings amount; and
responsive to an indication that the changed savings amount is sufficient to fund the first expense, displaying, in the GUI, the first expense shape within the savings shape.

10. A method for interfacing a computing system with a user; the method comprising:
displaying, at a display of the computing system, a graphical user interface (GUI), wherein the GUI comprises:
a savings shape indicating a savings amount;
a first expense shape indicating a first expense of the user; and
a second expense shape indicating a second expense of the user;
receiving, by the computing system, an instruction from the user to place the first expense shape within the savings shape;
responsive to receiving the instruction:
displaying, by the computing system, the first expense shape at least partially overlaying the savings shape; and
determining, by the computing system, that the savings amount is not sufficient to fund the first expense; and
responsive to determining that the savings amount is not sufficient to fund the first expense, displaying, by the computing system and in the GUI, the first expense shape passing through a boundary of the savings shape to a position outside the savings shape.

11. The method of claim 10, wherein a size of the first expense shape is based at least in part on a periodic amount that the user would need to save per instance of a time period to have an amount of the first expense at a first expense time.

12. The method of claim 10, further comprising:
accessing second expense data describing the second expense of the user, wherein the second expense data indicates an amount of the second expense;
receiving from the user an instruction to place the second expense shape within the savings shape;
responsive to receiving the instruction to place the second expense shape within the savings shape:
displaying the second expense shape at least partially overlaying the savings shape; and
determining that the savings amount is sufficient to fund the second expense; and
responsive to determining that savings amount is sufficient to fund the second expense, displaying, in the GUI, the second expense shape positioned within the savings shape.

13. The method of claim 12, wherein the savings shape has a size based at least in part on a projected savings amount of the user, and wherein a size of a remainder of the savings shape that is not covered by the second expense shape is indicative of a remainder of the savings amount that is left over after funding the second expense.

14. The method of claim 10, further comprising:
determining a second size for the savings shape using actual savings data describing an actual savings amount; and
changing the savings shape to the second size.

15. The method of claim 14, further comprising, responsive to an indication that the actual savings amount is sufficient to fund the first expense, displaying, in the GUI, the first expense shape within the savings shape.

16. The method of claim 10, wherein a size of the savings shape describes at least one of an area of the savings shape or a volume of the savings shape.

17. The method of claim 10, further comprising:
modifying a size of the first expense shape based at least in part on first changed expense data describing a change to the first expense;
determining that the savings amount is sufficient to fund the first expense based at least in part on the first changed expense data; and
displaying, in the GUI, the first expense shape within the savings shape.

18. The method of claim 10, further comprising:
modifying a size of the savings shape based at least in part on changed savings data describing a changed savings amount; and
responsive to an indication that the changed savings amount is sufficient to fund the first expense, displaying the first expense shape within the savings shape.

19. A non-transitory machine-readable medium comprising instructions thereon that, when executed by at least one processor, cause the at least one processor to perform operations comprising:
displaying, in a display associated with the at least one processor, a graphical user interface (GUI), wherein the GUI comprises:
a savings shape indicating a savings amount;
a first expense shape indicating a first expense of a user; and
a second expense shape indicating a second expense of the user;
receiving an instruction from the user to place the first expense shape within the savings shape;
responsive to receiving the instruction:
displaying the first expense shape at least partially overlaying the savings shape; and determining that the savings amount is not sufficient to fund the first expense; and responsive to determining that the savings amount is not sufficient to fund the first expense, displaying, in the GUI, the first expense shape passing through a boundary of the savings shape to a position outside the savings shape.

20. The medium of claim 19, wherein a size of the first expense shape is based at least in part on a periodic amount that the user would need to save per instance of a time period to have an amount of the first expense at a first expense time.

* * * * *

UNITED STATES PATENT AND TRADEMARK OFFICE
CERTIFICATE OF CORRECTION

| | |
|---|---|
| PATENT NO. | : 11,734,764 B1 |
| APPLICATION NO. | : 17/643776 |
| DATED | : August 22, 2023 |
| INVENTOR(S) | : Simpson et al. |

It is certified that error appears in the above-identified patent and that said Letters Patent is hereby corrected as shown below:

On the Title Page

On page 2, in Column 1, under item (56) "U.S. Patent Documents", Line 2, delete "2002/0015671" and insert --2002/0156710-- therefor In the Claims In Column 19, Line 40, in Claim 10, delete "user;" and insert --user,-- therefor Signed and Sealed this
Seventh Day of November, 2023

Katherine Kelly Vidal
*Director of the United States Patent and Trademark Office*